US012519264B2

(12) United States Patent
Wolfe

(10) Patent No.: US 12,519,264 B2
(45) Date of Patent: Jan. 6, 2026

(54) ELECTRICAL CONNECTOR ASSEMBLY WITH HORIZONTAL TO VERTICAL WAFER INTERCONNECTIONS

(71) Applicant: MOLEX, LLC, Lisle, IL (US)

(72) Inventor: Matthew Wolfe, Conway, AR (US)

(73) Assignee: Molex, LLC, Lisle, IL (US)

( * ) Notice: Subject to any disclaimer, the term of this patent is extended or adjusted under 35 U.S.C. 154(b) by 351 days.

(21) Appl. No.: 18/028,774

(22) PCT Filed: Oct. 4, 2021

(86) PCT No.: PCT/IB2021/059078
§ 371 (c)(1),
(2) Date: Mar. 28, 2023

(87) PCT Pub. No.: WO2022/074532
PCT Pub. Date: Apr. 14, 2022

(65) Prior Publication Data

US 2023/0369800 A1 Nov. 16, 2023

Related U.S. Application Data

(60) Provisional application No. 63/089,005, filed on Oct. 8, 2020.

(51) Int. Cl.
*H01R 13/514* (2006.01)
*H01R 13/518* (2006.01)
(Continued)

(52) U.S. Cl.
CPC ......... *H01R 13/514* (2013.01); *H01R 13/518* (2013.01); *H01R 13/6471* (2013.01); *H01R 13/6586* (2013.01)

(58) Field of Classification Search
CPC .............. H01R 13/518; H01R 13/6471; H01R 13/6586
(Continued)

(56) References Cited

U.S. PATENT DOCUMENTS 8,469,745 B2 * 6/2013 Davis .................. H01R 12/737 439/607.07
8,864,501 B2 * 10/2014 Lin ..................... H01R 13/658 439/79
(Continued)

FOREIGN PATENT DOCUMENTS

CN 106450853 A 2/2017
CN 208955247 U 6/2019
(Continued)

OTHER PUBLICATIONS

International Preliminary Report on Patentability received for PCT Application No. PCT/IB2021/059078, mailed on Apr. 20, 2023, 16 pages.
(Continued)

*Primary Examiner* — Phuong K Dinh

(57) ABSTRACT

An electrical connector assembly may include a plurality of horizontal wafers used in combination with a plurality of vertical wafers. The vertical wafers may include terminals that interconnect with a set of non-high-speed terminals located in the horizontal wafers. The vertical wafers may be positioned side-by-side and placed to engage with the rear edges of the horizontal wafers.

20 Claims, 19 Drawing Sheets

(51) Int. Cl.
*H01R 13/6471* (2011.01)
*H01R 13/6586* (2011.01)

(58) Field of Classification Search
USPC ........................................ 439/607.07, 607.05
See application file for complete search history.

(56) References Cited

U.S. PATENT DOCUMENTS 9,136,634 B2 * 9/2015 De Geest ............. H01R 13/514
9,437,988 B2 * 9/2016 McGrath ................ H01R 24/60
2004/0072467 A1 * 4/2004 Jordan ................. H01R 12/775
439/492
2011/0300757 A1 12/2011 Regnier et al.
2013/0130547 A1 5/2013 Simpson et al.
2014/0041937 A1 2/2014 Lloyd et al.
2016/0197423 A1 7/2016 Regnier
2018/0109037 A1 4/2018 Resendez et al.
2018/0212338 A1 7/2018 Chang
2020/0194913 A1 6/2020 Avery
2020/0266583 A1 8/2020 Laurx et al.
2020/0295513 A1 9/2020 Ellison

FOREIGN PATENT DOCUMENTS

CN 208955287 U 6/2019
JP 2005507141 A 3/2005
JP 2018517969 A 7/2018
TW I623154 B 5/2018

OTHER PUBLICATIONS

International Search Report and Written Opinion received for PCT Application No. PCT/IB2021/059078, mailed on Jan. 5, 2022, 19 pages.

* cited by examiner

ELECTRICAL CONNECTOR ASSEMBLY WITH HORIZONTAL TO VERTICAL WAFER INTERCONNECTIONS

CROSS-REFERENCE TO RELATED APPLICATION

This application is a national phase of PCT/IB2021/059078, filed on Oct. 4, 2021, which claims priority to U.S. Provisional Application 63/089,005, filed Oct. 8, 2020 ("'005 Application"), both of which are incorporated herein by reference in their entireties.

INTRODUCTION

High-speed or high data rate electrical connectors often incorporate a plurality of wafer assemblies that supports a plurality of electrically conductive terminals. However, where physical space is minimal, it is a challenge to configure a high-speed or high data rate connector ("high-speed" and "high data rate" may be used interchangeably herein) with wafer assemblies that incorporate separately interconnected low-speed and/or power terminals within such a minimal footprint while at the same time maintaining adequate electrical characteristics for the transmission of signals at a high data rate.

Accordingly, it is desirable to provide a high-speed connector with a minimum footprint that includes wafer assemblies that incorporate separately interconnected low-speed and/or power terminals while at the same time maintaining adequate electrical characteristics for the transmission of signals at a high data rate.

SUMMARY

The disclosure describes electrical connector assemblies for electrically interconnecting a first plurality of wafers (i.e., a plurality of horizontally-configured wafers) with a second plurality of wafers (i.e., a side-by-side collection of vertically-configured wafers). Each horizontal wafer may include a first set of terminals conducting high data rate signals and a second set of terminals conducting non-high data rate signals (e.g., low-data rate signals and/or power connections). The side-by-side collection of vertically-configured wafers may be formed to include non-high-speed terminals in like number and position with respect to the second set of terminals within the horizontal wafers, providing a path for the conduction of non-high data rate signals separate from the path provided for high data rate signals exiting the horizontal wafers.

In one embodiment, an electrical connector assembly may include a plurality of horizontal wafers used in a combination with a set of vertical wafers, the vertical wafers having non-high-speed terminals that interconnect with similar terminals within the plurality of horizontal wafers. In particular, each horizontal wafer may include high-speed terminals configured to conduct signaling at a high data rate and non-high-speed terminals configured to conduct power and signaling at a lower data rate than the high-speed terminals. The high-speed terminals and the non-high-speed terminals may have contacts aligned in a row adjacent a front edge of the horizontal wafer and have terminal bodies extending rearward of the contacts and terminating as tails that are either exposed beyond a rear edge of the horizontal wafer or terminated to conductors of cables. Each of the horizontal wafers may include a ground shield extended either over, or under, a portion of the terminal bodies of the high-speed terminals. The vertical wafers may be positioned side-by-side, with each vertical wafer including non-high-speed terminals having a contact portion, a tail portion and a body portion therebetween, the contact portion being configured to mate with a tail of each non-high-speed terminal of the plurality of horizontal wafers, for example.

In more detail, in one embodiment an electrical connector assembly may comprise: (i) a plurality of horizontal wafers, each horizontal wafer comprising, high-speed terminals configured to conduct signaling at a high data rate (e.g., generally 50 Gbps or more, potentially at data rates equal to or exceeding 112 Gbps), non-high-speed terminals configured to conduct power and signaling at a low-data rate (e.g., typically less than 20 Gbps and often less than 5 Gbps), wherein the high-speed terminals and the non-high-speed terminals comprise contacts aligned in a row adjacent a front edge of the horizontal wafer and terminal bodies extending rearward of the contacts, the high-speed terminals configured to terminate to conductors in a cable, where the cable extends beyond a rear edge of the horizontal wafer and the non-high-speed terminals configured to terminate as tails exposed at the rear edge of the horizontal wafer, and a ground shield (e.g., a plastic element with a plated covering of a conductive material, or a stamped metal frame overmolded with plastic or a conductive plastic or some other known structural configuration) over or under a portion of the terminal bodies of the high-speed terminals; and (ii) a plurality of vertical wafers, the plurality of vertical wafers being positioned side-by-side and each vertical wafer comprising, terminals, each terminal comprising a contact portion (e.g., a C-clamp structure or a cantilevered element include a conductive bump), a tail portion and a body portion therebetween, and each contact portion being configured to mate with a tail of each non-high-speed terminal at an interior edge of the plurality of horizontal wafers.

The plurality of vertical wafers may comprise a tiered configuration for mating with the plurality of interior edges of the plurality of horizontal wafers, for example.

In an embodiment, when the contact portion comprises a C-clamp structure, such a structure may comprise a pair of eye-of-the-needle elements, separated by a throat spacing, for example.

Inventive electrical connector assemblies may also comprise a support and stabilization element configured to support the plurality of vertical wafers in a stable side-by-side position, and/or a locating pin configured to pass through a set of apertures formed in each vertical wafer of the plurality of vertical wafers, as well as apertures formed in end termination regions of the insulative housing, where the locating pin is configured to support the plurality of vertical wafers in an aligned relationship with the plurality of horizontal wafers.

In an embodiment, the high-speed terminals may comprise a differential pair of signal terminals and one or more ground terminals, and the electrical connector assembly may further comprise a ground shield that may be configured to contact the ground terminal(s) adjacent the contact(s). The high-speed terminals of each horizontal wafer may be terminated to cables configured to convey signaling at the high data rate, for example.

Still further, in another embodiment each vertical wafer may be configured as a tiered structure and may comprise a plurality of separate landing steps that expose the contact portion of each of the vertical wafer terminals, the plurality of separate landing steps being at least sufficient to support the plurality of horizontal wafers in a one-to-one relationship, with each exposed contact portion connecting with the interior edge.

In addition to the electrical connector assemblies described above, additional electrical connector assemblies are described herein. For example, in one embodiment an exemplary electrical connector assembly may comprise: (i) a plurality of horizontal wafers, each horizontal wafer comprising, high-speed terminals configured to conduct signaling at a high data rate, non-high-speed terminals configured to conduct power and signaling at a low-data rate, wherein the high-speed terminals and the non-high-speed terminals comprise contacts aligned in a row adjacent a front edge of the horizontal wafer and terminal bodies extending rearward of the contacts, at least a portion of the high-speed terminals configured to terminate to conductors in a cable and the non-high-speed terminals configured to terminate as tails exposed from the rear edge with the rear edge near the tails being somewhat recessed; and (ii) a plurality of vertical wafers, the plurality of vertical wafers being positioned side-by-side and each vertical wafer comprising, terminals having a contact portion (e.g., a C-clamp structure), a tail portion and a body portion therebetween, the contact portion being configured to mate with a tail of each non-high-speed terminal at the interior edges of the plurality of horizontal wafers, wherein the plurality of vertical wafers has exactly one vertical wafer for each non-high-speed terminal in one of the horizontal wafers, and wherein each horizontal wafer of the plurality of horizontal wafers has a same number of non-high-speed terminals.

Yet further, electrical connector assemblies may comprise a support and stabilization element configured to span across and capture the plurality of vertical wafers to support and stabilize the side-by-side arrangement. Still further, each vertical wafer of a connector assembly may comprise an alignment aperture and a locating pin configured to pass through the alignment apertures to support the plurality of vertical wafers in an aligned position with respect to the plurality of horizontal wafers.

In an embodiment, the high-speed terminals may comprise a differential pair of signal terminals.

Similar to above, the additional electrical assemblies may comprise an insulative housing configured to surround a joined arrangement of the plurality of horizontal wafers and the plurality of vertical wafers. Further, in an embodiment, terminals of a plurality of vertical wafers may be configured to exit through a bottom surface of the insulative housing and the high-speed terminals of the plurality of horizontal wafers may be configured to exit through a surface of the insulative housing other than the bottom surface.

Components of electrical connector assemblies are also disclosed, including, but not limited to, a horizontal wafer for use within an electrical connector assembly that may comprise: a frame composed of an insulative material, the frame element comprising a front edge and an opposing rear edge; a plurality of high-speed terminals configured to conduct signaling at a high data rate and supported by the frame, each high-speed terminal comprising a contact end portion exposed at the front edge of the frame element and a tail end portion exposed at the rear edge, with a body portion of each high-speed terminal embedded within the insulative material of the frame element; and, non-high-speed terminals configured to conduct power and signaling at a low-data rate, wherein the non-high-speed terminals are aligned with the plurality of high-speed terminals and each non-high-speed terminal comprises a contact portion exposed at the front edge of the frame element and a tail end portion exposed at an interior edge recessed from the rear edge, with a body portion of each high-speed terminal embedded within the insulative material of the frame.

The above features and advantages as well as others will be apparent from the following detailed description and the accompanying drawings.

BRIEF DESCRIPTION OF THE DRAWINGS

The present disclosure is illustrated by way of example and not limited to the accompanying figures in which like reference numerals refer to like elements and in which.

DETAILED DESCRIPTION, INCLUDING EXEMPLARY EMBODIMENTS

Simplicity and clarity in both illustration and description are sought to effectively enable a person of skill in the art to make, use, and best practice embodiments disclosed herein in view of what is already known in the art. One skilled in the art will appreciate that various modifications and changes may be made to the specific embodiments described herein without departing from the spirit and scope of the disclosure. Thus, the specification and drawings are to be regarded as illustrative and exemplary rather than restrictive or all-encompassing, and all such modifications to the specific embodiments described herein are intended to be included within the scope of the disclosure. Yet further, it should be understood that the detailed description that follows describes exemplary embodiments and is not intended to be limited to the expressly disclosed combination(s). Therefore, unless otherwise noted, features disclosed herein may be combined together to form additional combinations that were not otherwise described or shown for purposes of brevity.

It should also be noted that one or more exemplary embodiments may be described as a method. Although a method may be described in an exemplary sequence (i.e., sequential), it should be understood that such a method may also be performed in parallel, concurrently or simultaneously. In addition, the order of each formative step within a method may be re-arranged. A described method may be terminated when completed, and may also include additional steps that are not described herein if, for example, such steps are known by those skilled in the art.

As used herein, the term “embodiment” or “exemplary” mean an example that falls within the scope of the disclosure.

Figure 1:
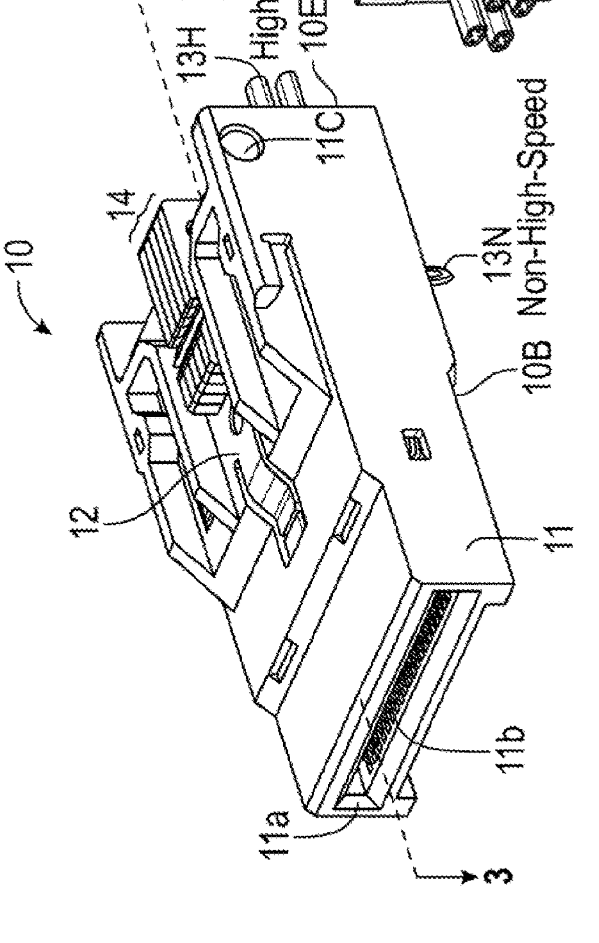
FIG. 1 is a perspective top view of an exemplary, electrical connector assembly for mating a plurality of horizontal wafers with a side-by-side arrangement of vertical wafers.
Figure 2:
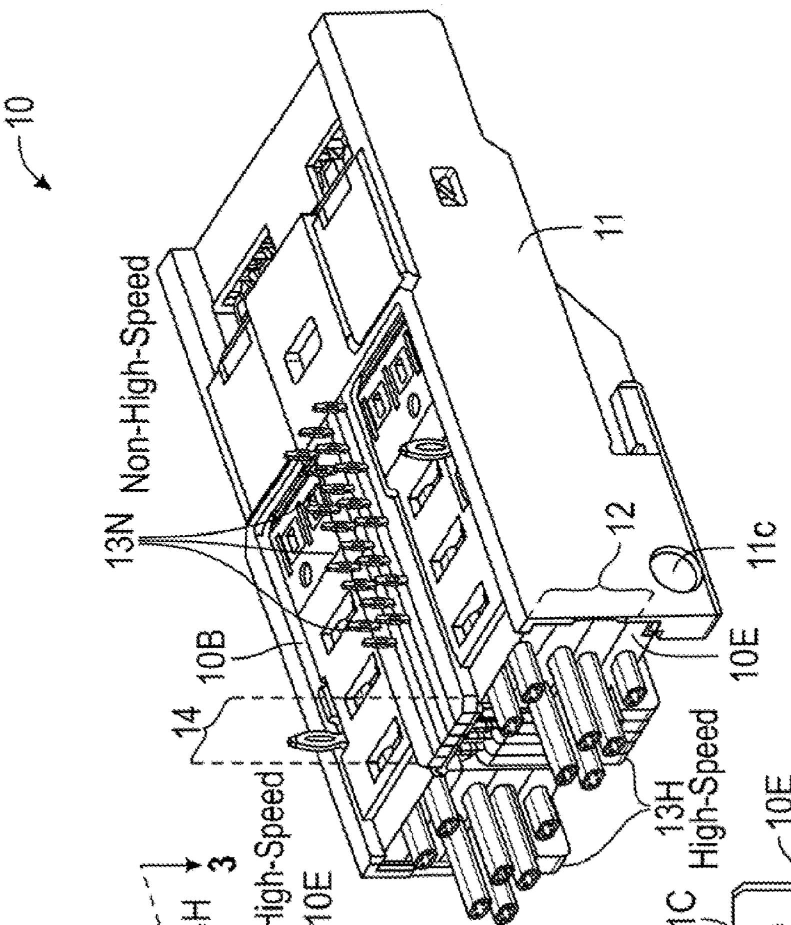
FIG. 2 is a perspective bottom view of the electrical connector assembly shown in FIG. 1.
Figure 3:
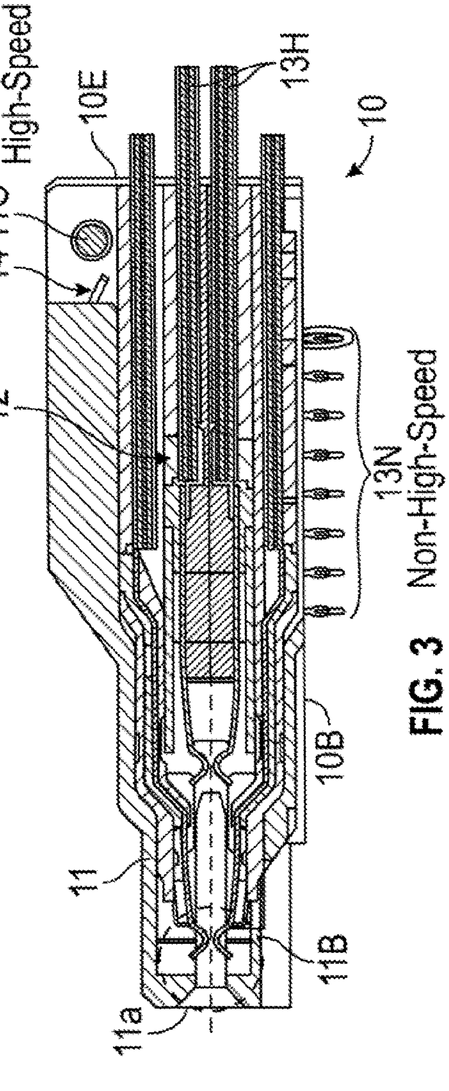
FIG. 3 is a simplified side view of the electrical connector assembly of FIG. 1.
Figure 4:
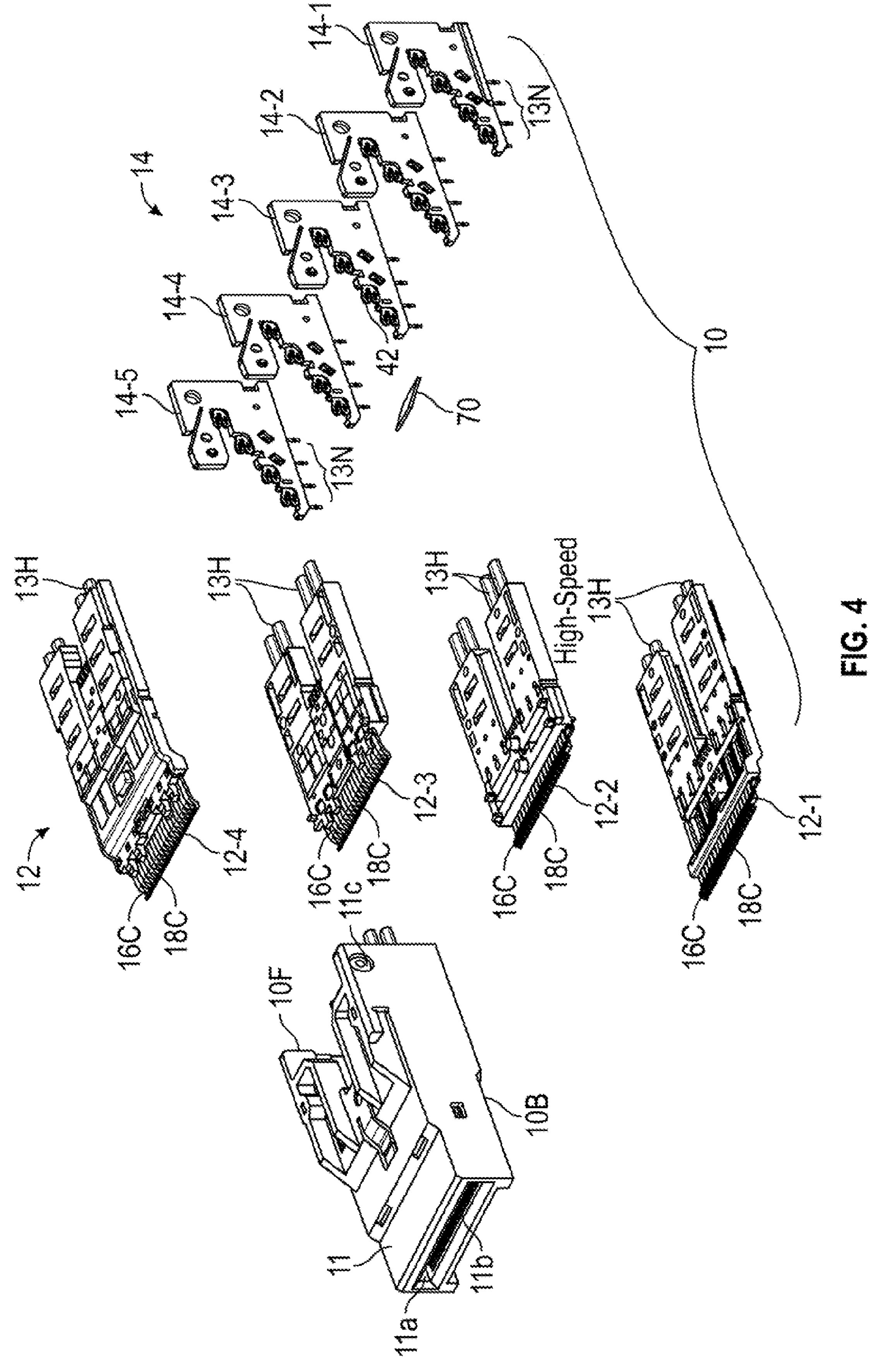
FIG. 4 is an exploded view of the electrical connector assembly of FIG. 1.

Referring to FIGS. 1-4, an embodiment of an exemplary, electrical connector assembly 10 (referred to as “assembly 10”) is depicted, where FIG. 1 depicts a side elevation view of assembly 10, FIG. 2 depicts an isometric view from the underside of assembly 10, FIG. 3 is a cut-away side view of assembly 10 taken along line 3-3 of FIG. 1 and FIG. 4 depicts a partially exploded view of components of assembly 10. In an embodiment, the assembly 10 may include an insulative housing 11 that may be composed of a Liquid Crystal Polymer (LCP) material or other desirable resin, for example, a plurality of horizontal wafers 12, and a plurality of vertical wafers 14, for example. The housing defines a card slot 11*a* that includes terminal grooves 11*b* configured to be aligned with at least some of the contacts of the high speed terminals. The housing further includes an alignment aperture 11*c* that can be used to accept a pin, not shown, that can be inserted through the alignment aperture 11*c* and through apertures in vertical wafers so as to provide additional support.

In an embodiment, the plurality of horizontal wafers 12 may engage with the plurality of vertical wafers 14 within insulative housing 11 such that non-high-speed terminals within horizontal wafers 12 mate with connectors (not shown) within vertical wafers 14 to conduct respective low-speed data (e.g., 1 Gbps) or power signals along electrical paths that are separate and distinct from paths dedicated to the conduction of signals at a high data rate that may pass through electrical connector assembly 10. Said another way, in this embodiment high data rate signals passing through and along a separate set of terminals within horizontal wafers 12 are not connected to vertical wafers 14, but instead are directly connected to mating, high-speed structures (e.g., electrical transmission cables such as twinax cables).

Backtracking somewhat, in the views of FIGS. 1-3, one exemplary configuration of high data rate signal paths 13H are shown as exiting at a rear edge 10E of assembly 10, while non-high data rate signal paths 13N are shown as exiting along a bottom surface 10B of assembly 10. As can be appreciated, the high data rate signal paths can be in the form of cables with two conductors such as, but not limited to, twin-ax cables and can include different forms of drain wire configurations, ranging from no drain wire, to wide flat drain wires to twin drain wires or any other desirable configuration.

The exemplary side-by-side arrangement of vertical wafers 14, in combination with a plurality of horizontal wafers 12, may form a low profile, minimized footprint (i.e., compact) electrical connector assembly 10 that provides separate signal paths for high data rate signals, low-data rate signals/power signals as well as direct-to-board connections for low-data rate signals and/or power signals.

Continuing, in the exploded view of FIG. 4 the exemplary assembly 10 may include four separate horizontal wafers

12-1, 12-2, 12-3 and 12-4 that may each include high-speed terminals 16 and non-high-speed terminals 18. In an embodiment, the connector ends 18*c* of non-high-speed terminals 18 may be positioned in alignment with the connector ends 16*c* of high-speed terminals 16.

The number of individual vertical wafers 14 used in electrical connector assembly 10 may be chosen so that at least one vertical wafer 14 may be connected to each individual horizontal wafer 12-*i*. As shown in FIG. 4, each vertical wafer 14 may be formed to exhibit a tiered structure, including a set of landing steps (see elements 44-1, 44-2 in FIG. 11 for example) for exposing separate vertical terminals 42. The number of landing steps formed within each vertical wafer 14 may be selected to accommodate at least the total number of individual horizontal wafers 12, for example. In one embodiment, in an electrical connector assembly 10 that includes a set of four horizontal wafers 12, each vertical wafer 14 may include at least four separate landing steps, it being understood that two horizontal wafers or more than four horizontal wafers may be used if desired. Further, in an electrical connector assembly 10 using horizontal wafers 12 with each wafer having a set of five non-high-speed terminals 18, a collection of five vertical wafers 14 (positioned side-by-side) may be used to fully interconnect with terminals 18.

Figure 5:
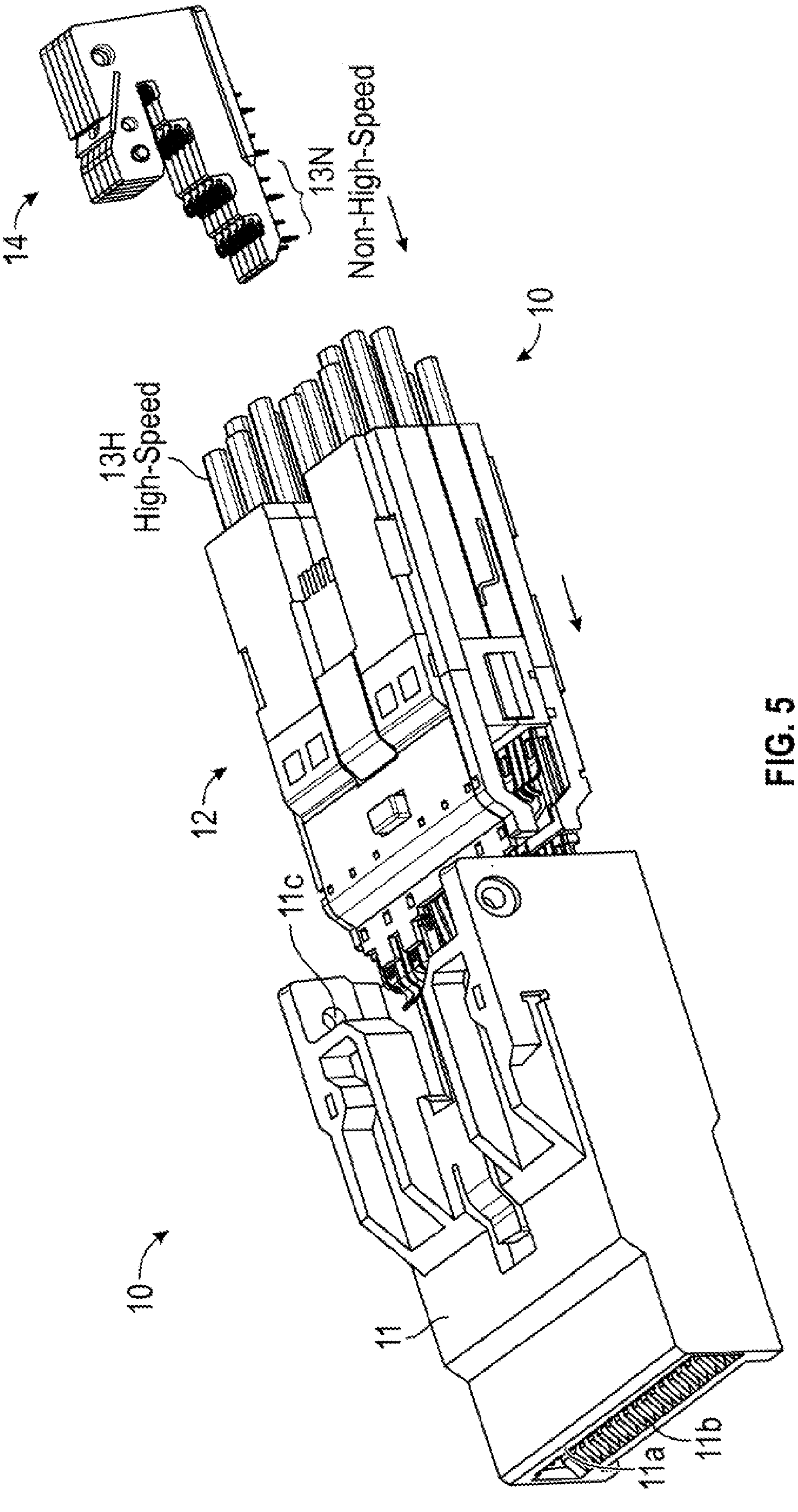
FIG. 5 is a partially exploded view of the electrical connector assembly of FIG. 1, illustrating the spatial relationship between an exemplary insulative body and the horizontal wafers, as well as between the horizontal wafers and the collection of vertical wafers.

Referring now to FIG. 5 there is illustrated an exemplary configuration of electrical connector assembly 10 that may be formed by inserting a plurality of horizontal wafers 12 within insulative housing 11, followed by the insertion of a side-by-side collection of vertical wafers 14 to engage with the non-high-speed terminals that may exit on the backside of each horizontal wafer 12.

Figure 6:
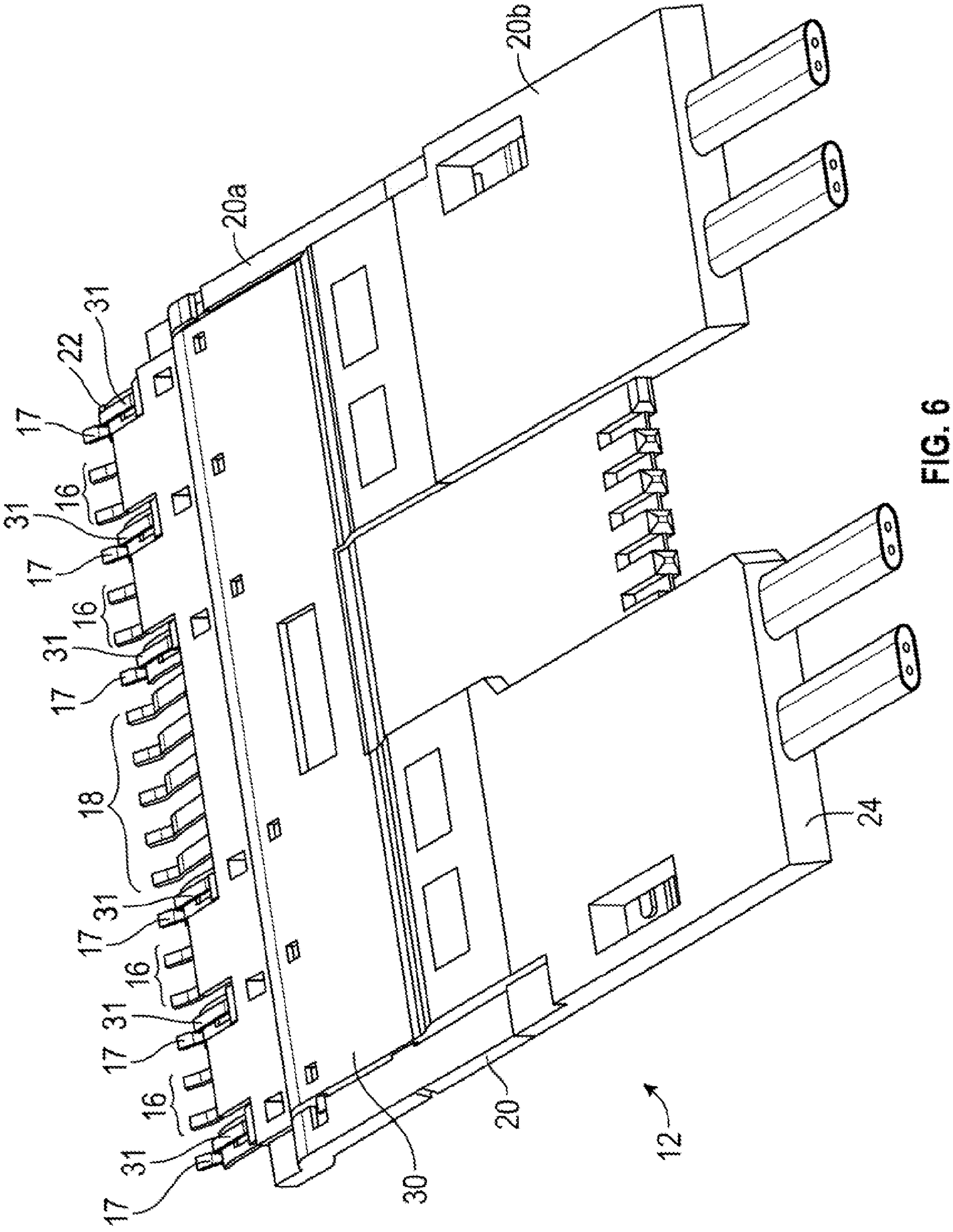
FIG. 6 is a perspective view from above of a horizontal wafer illustrating the locations of various terminals.

FIG. 6 depicts an isometric elevation view of an exemplary horizontal wafer 12 that particularly illustrates an exemplary organization of high-speed terminals 16 and non-high-speed terminals 18 across the width of the wafer 12. In an embodiment, horizontal wafer 12 may include a frame 20 formed of an insulative material and configured to include a front edge 22 and a rear edge 24. As depicted, frame 20 includes a front portion 20*a* that supports high-speed terminals 16 and non-high-speed terminals 18, and a rear portion 20*b* that is overmolded onto the front portion, as well as over the corresponding cables once the conductors are attached to high-speed terminals 16. Naturally, if the cable conductors are pre-attached to high speed terminals 16, then frame 20 can be formed in a single molding operation.

Connector portions 16C of high-speed terminals 16 may extend in an alignment beyond front edge 22 of frame 20 and connector portions 18C of non-high-speed terminals 18 may also extend beyond front edge 22 and, further, may be positioned to be in alignment with connector portions 16C. The body portions of terminals 16, 18 (body portions 16B shown below in FIG. 7, for example) may be embedded within and supported by the insulative material of frame 20.

Figure 7:
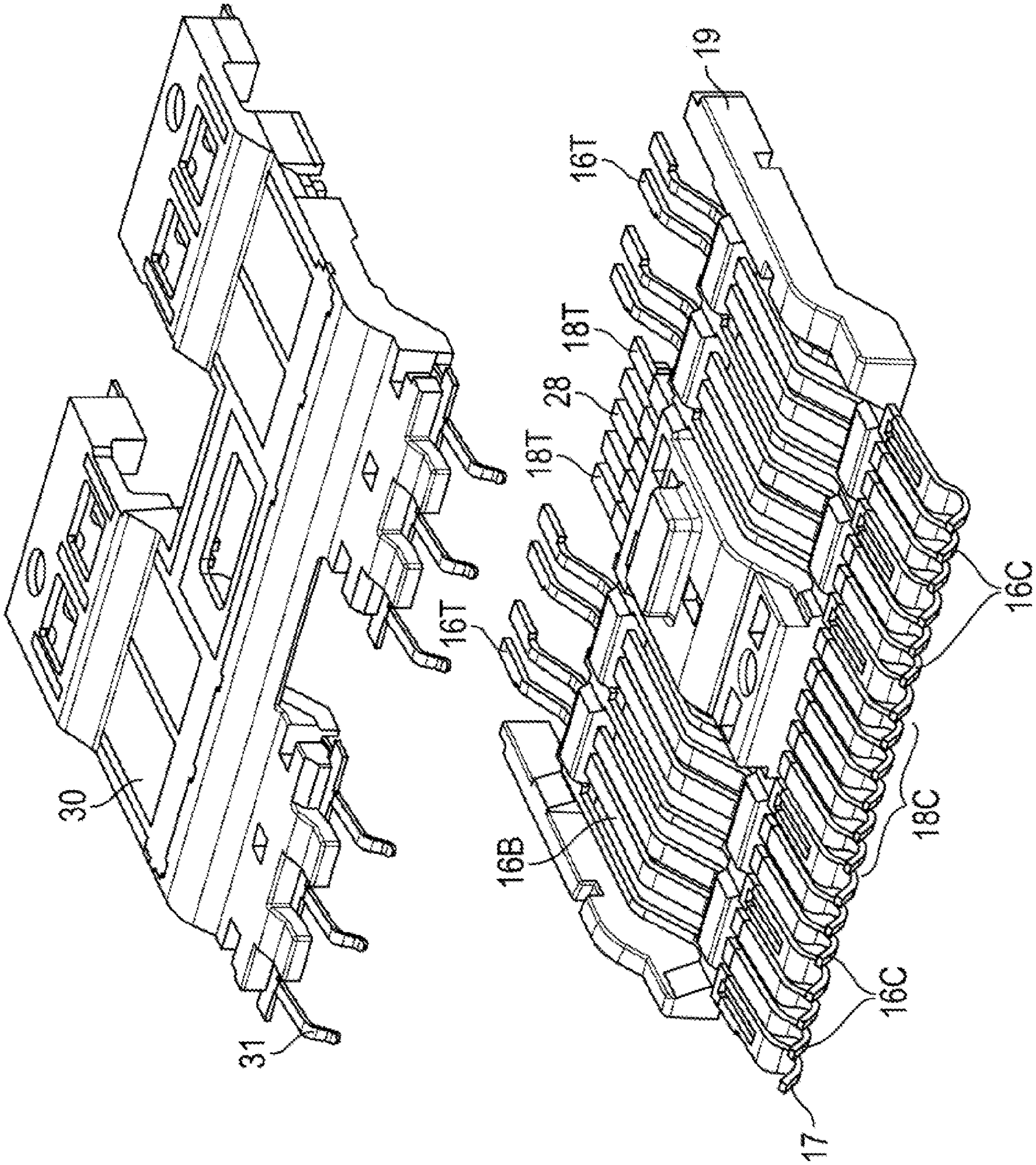
FIG. 7 is a partially exploded view of several components of the horizontal wafer of FIG. 6, illustrating in particular an exemplary frame that may be used to support the terminals, and an external ground shield (plated) with grounding pins exposed for mating with ground terminals on the frame.

FIG. 7 illustrates high-speed terminals 16 and non-high-speed terminals 18 as may be supported within a frame 19. The central positioning of non-high-speed terminals 18 is clearly shown, with one set of high-speed terminals 16 shown on either side. Each high-speed terminal 16 may be formed to include a connector portion 16C, a tail portion 16T, and a body portion 16B therebetween. As mentioned above, body portion 16B may ultimately be embedded within the insulative material of frame 20. Each non-high-speed terminal 18 may similarly be formed to include a connector portion 18C, a tail portion 18T, and a body portion 18B therebetween (with body portions 18B hidden within the material of frame 19 in the view of FIG. 7). As will be discussed in detail below, tail portions 18T of non-high-speed terminals 18 terminate along an interior edge 28 of frame 20 (see FIG. 6), with tail portions 16T perhaps extending further out from frame 19 and thereafter attached to cable conductors 21, as shown in FIG. 9.

Continuing with the description of FIG. 7, also shown on frame 19 is a set of ground terminals 17 that may connect with other components to form a grounding plane and provide EMI shielding for the high-speed signal paths. In one exemplary embodiment as shown in FIG. 7, a ground shield 30 may be positioned over frame 19 and used to provide EMI shielding. As shown, ground shield 30 includes a set of grounding tabs 31 that may engage with ground terminals 17 as ground shield 30 is positioned over frame 19.

Figure 8:
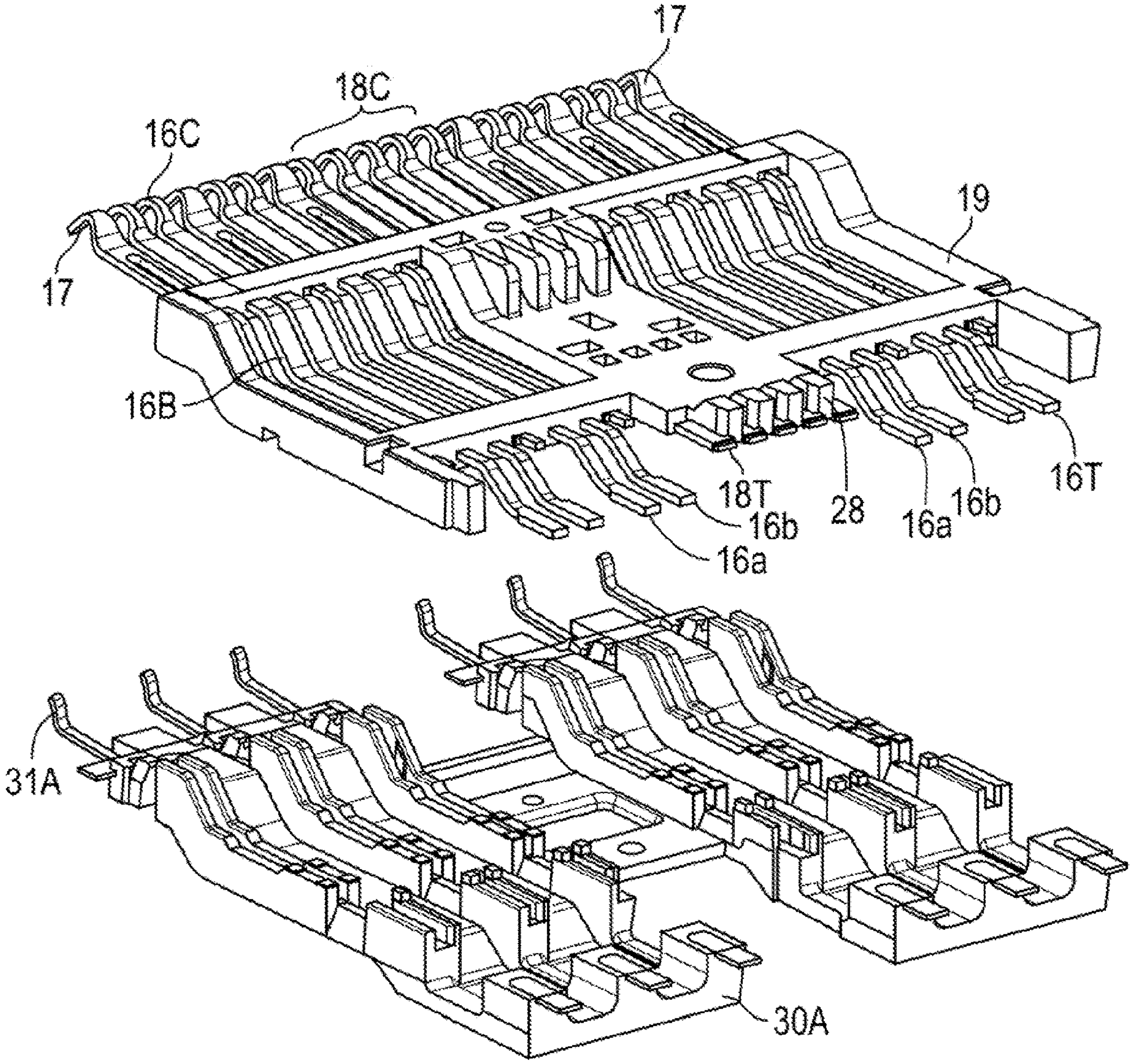
FIG. 8 is another partially exploded view of several components of the horizontal wafer of FIG. 6, this view showing in particular the frame in combination with an underside ground shield (also plated) with grounding pins exposed for mating with ground terminals on the frame and completing, in combination with the ground shield of FIG. 7, EMI shielding for the high-speed signal paths passing through the connector assembly.

In order to complete the EMI shielding structure, an underside ground shield 30A may also be used in combination with frame 19. FIG. 8 illustrates one example of this arrangement, where for the sake of clarity only frame 19 and underside ground shield 30A are shown (it is to be understood that ground shield 30, positioned over frame 19, may also be included in the final structure). Ground shield 30A includes grounding leadframe 31A that may engage with ground terminals 17 on frame 19.

Figure 9:
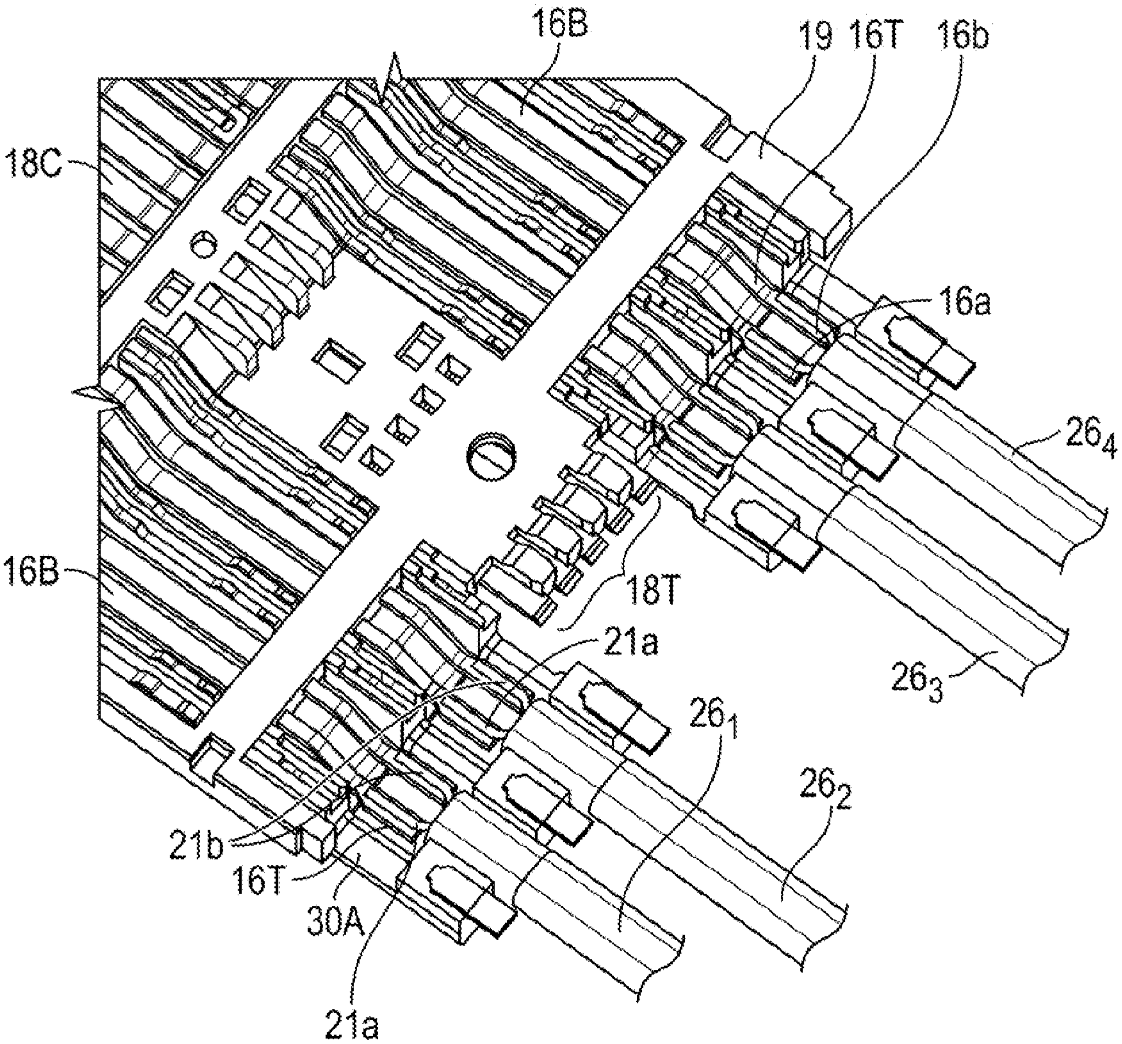
FIG. 9 illustrates a following step in the assembly of an exemplary horizontal wafer, showing in this close-up view of a portion of the horizontal wafer the attachment of individual conductors to each of the high-speed terminal tails exposed at the back side of the horizontal wafer, as well as cables that may encase pairs of conductors as shown to form a twinax cabling arrangement.
Figure 10:
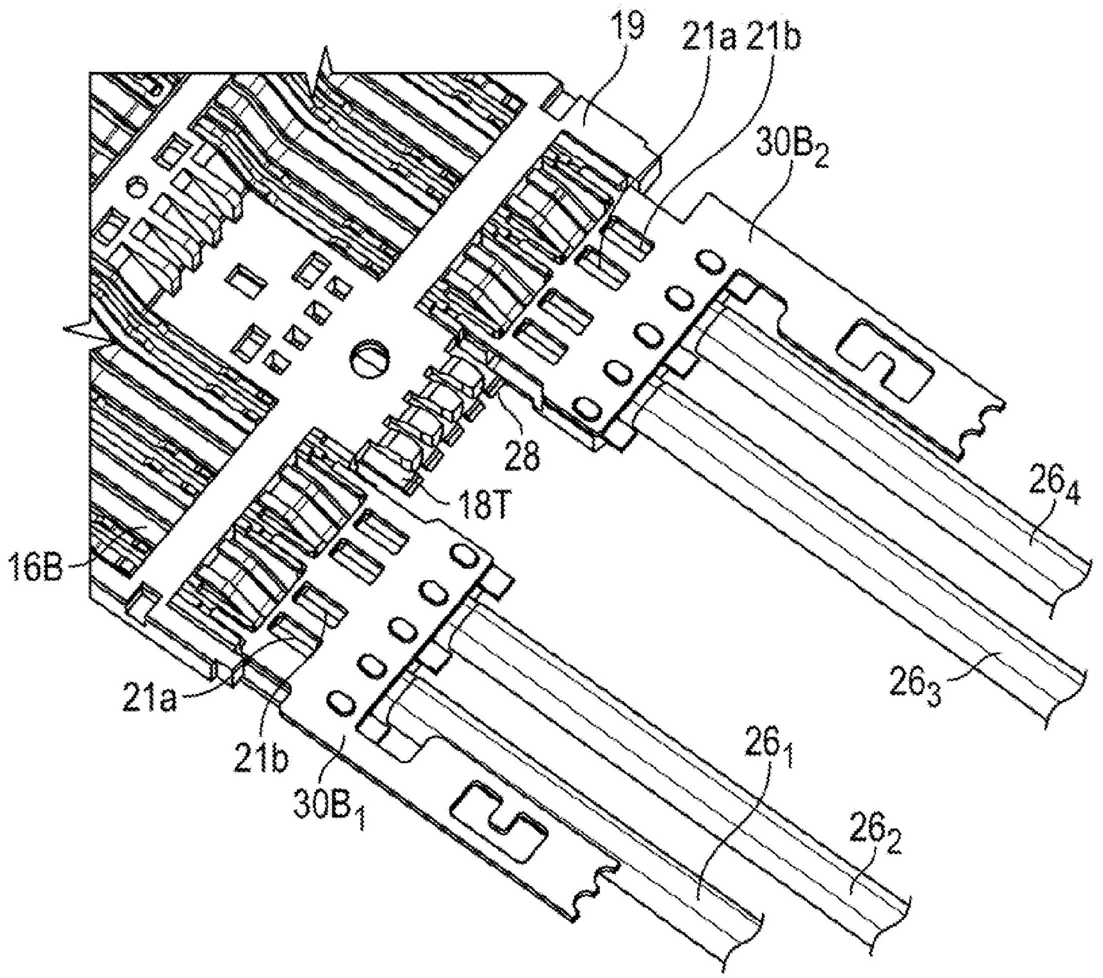
FIG. 10 illustrates an assembly step in the formation of an exemplary horizontal wafer, subsequent to the conductor and cable attachments as shown in FIG. 9, showing in particular a conductive leadframe that is added to provide shielding for the high-speed terminal/conductor connections at the rear of the horizontal wafer.

FIG. 9 illustrates a following step in an exemplary assembly of horizontal wafer 12. FIG. 9 is a close-up view of tail portions 16T of high-speed terminals 16 as may be in position on underside ground shield 30A (see FIG. 8). In this example, each high-speed terminal 16 is shown as taking the form of a differential pair of conductive terminals 16*a*, 16*b* which may be a preferred arrangement for supporting transmission of signals with a high data rate. In an embodiment, exemplary electrical connector assembly 10 may be used in a system supporting data transmissions within a typical range of 100-120 Gbps (e.g., 112 Gbps). A separate conductor 21*a*, 21*b* may be attached to the paired conductive terminals 16*a*, 16*b*. The example as shown in FIG. 9 creates a structure with a set of four high-speed outputs, with each separate conductor pair 21*a*, 21*b* encased within a cable 26 (shown as cables $\mathbf{26}_1$, $\mathbf{26}_2$, $\mathbf{26}_3$, and $\mathbf{26}_4$ in FIG. 9 for illustrative purposes only). As noted, the cables can be a desirable twin-ax configuration. A pair of grounding straps 30B1 and 30B2 may then be positioned over the "cabled" terminations of high-speed terminals 16 with conductors 21, as shown in FIG. 10.

The details of the assembly process of horizontal wafer 12, as shown in FIGS. 7-10 is intended to assist in understanding the operations of horizontal wafer 12 as discussed above in association with FIG. 6, where a further discussion of FIG. 6 with respect to the interconnection between horizontal wafer 12 and vertical wafer 14 will continue in the following paragraph.

Referring to FIG. 6, in an embodiment, tail portions 18T of non-high-speed terminals 18 may be exposed along a recessed rear edge 28 that may be somewhat recessed with respect to rear edge 24 of frame 20 by an amount "S". The spacing amount "S" between recessed rear edge 28 and rear edge 24 may differ for each horizontal wafer 12 and may be designed to properly engage with the tiered configuration of vertical wafers 14. In one exemplary embodiment, the spacing amount S may be in the range of 4 millimeters to 15 millimeters, for example. For illustrative purposes, a set of five individual non-high-speed terminals $\mathbf{18}_1$ through $\mathbf{18}_5$ is depicted in horizontal wafer 12 of FIG. 6.

Figure 11:
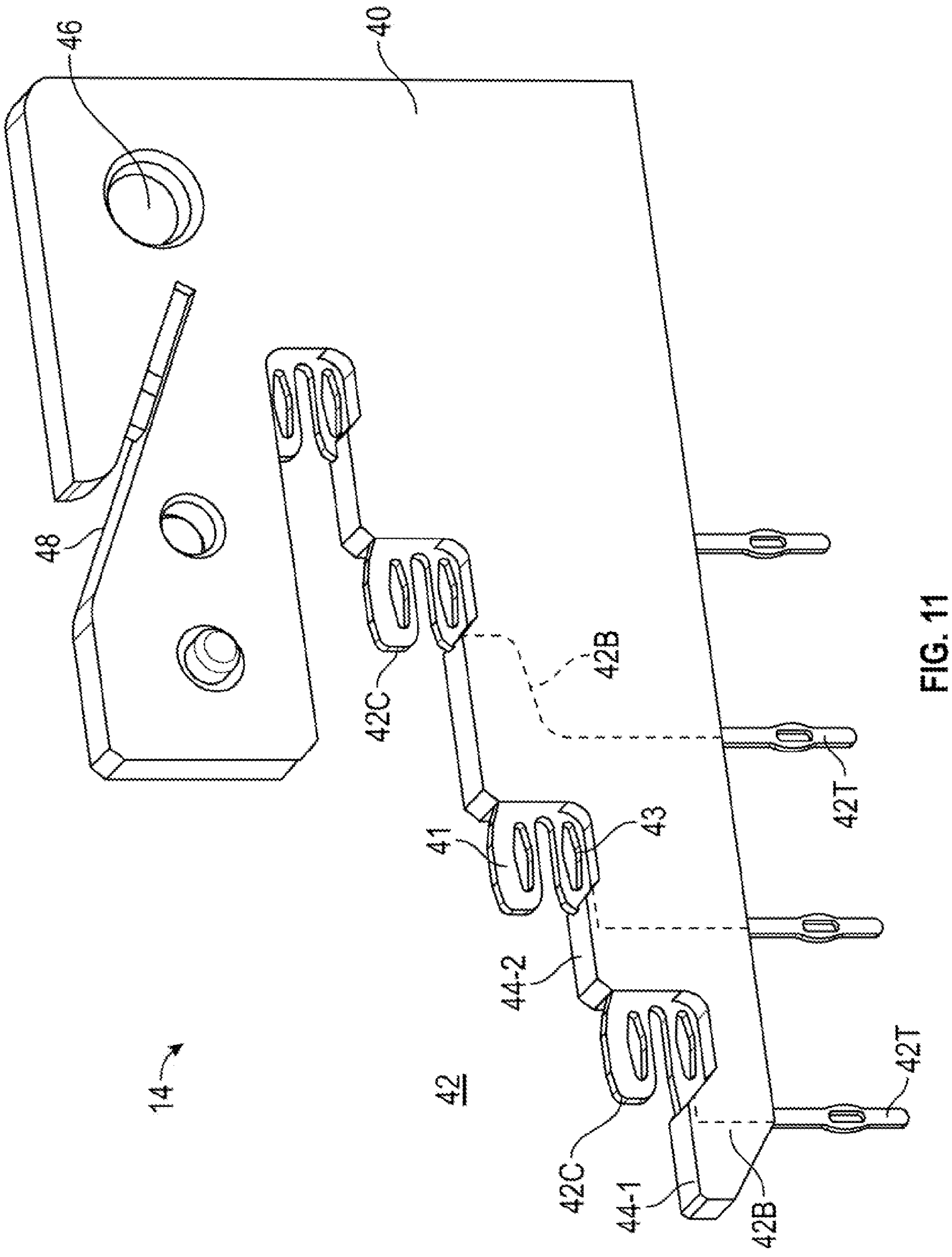
FIG. 11 is a perspective view from the side of a vertical wafer illustrating the tiered configuration of a frame in combination with the terminals positioned to interconnect with low-speed and/or power terminals (collectively referred to as "non-high-speed terminals") of a plurality of horizontal wafers.

Referring now to FIG. 11 there is depicted an enlarged view of an exemplary vertical wafer 14. Wafer 14 may include an frame 40, which can be formed of an insulative material, configured to include one or more, vertical terminals 42 that may form one or more connections between non-high-speed terminals 18 of a plurality of horizontal wafers 12 and a circuit board (or other suitable low-speed/power wire connection; not shown in FIG. 11). In this embodiment, each vertical terminal 42 is shown as having a connector end portion 42C (configured to mate with a corresponding non-high-speed terminal 18 of a horizontal wafer 12), a vertically-configured tail end portion 42T, and a body portion 42B therebetween. FIG. 11 also depicts exemplary tail portions 42T of vertical terminal 42. In an embodiment, portions 42T may comprise press-fit pins for terminating low-speed data or electrical power connections. Alternatively, a surface-mount-technology (SMT) type of connection may be used as the tail portions of vertical terminals 42. Frame 40 may include a plurality of landing steps 44, where each individual landing step may be used to support a separate one of the horizontal wafers 12. In particular, the recessed rear edges 28 of horizontal wafers 12 may be positioned on landing steps 44 (see FIG. 13, for example). In an embodiment, the staggered arrangement of landing steps (i.e., a tiered structure) combined with the different spacing amounts S between rear edge 24 and recessed rear edge 28 allows a side-by-side arrangement of vertical wafers 14 to engage with the horizontal wafers 12 in a compact, low profile form.

Figure 17:
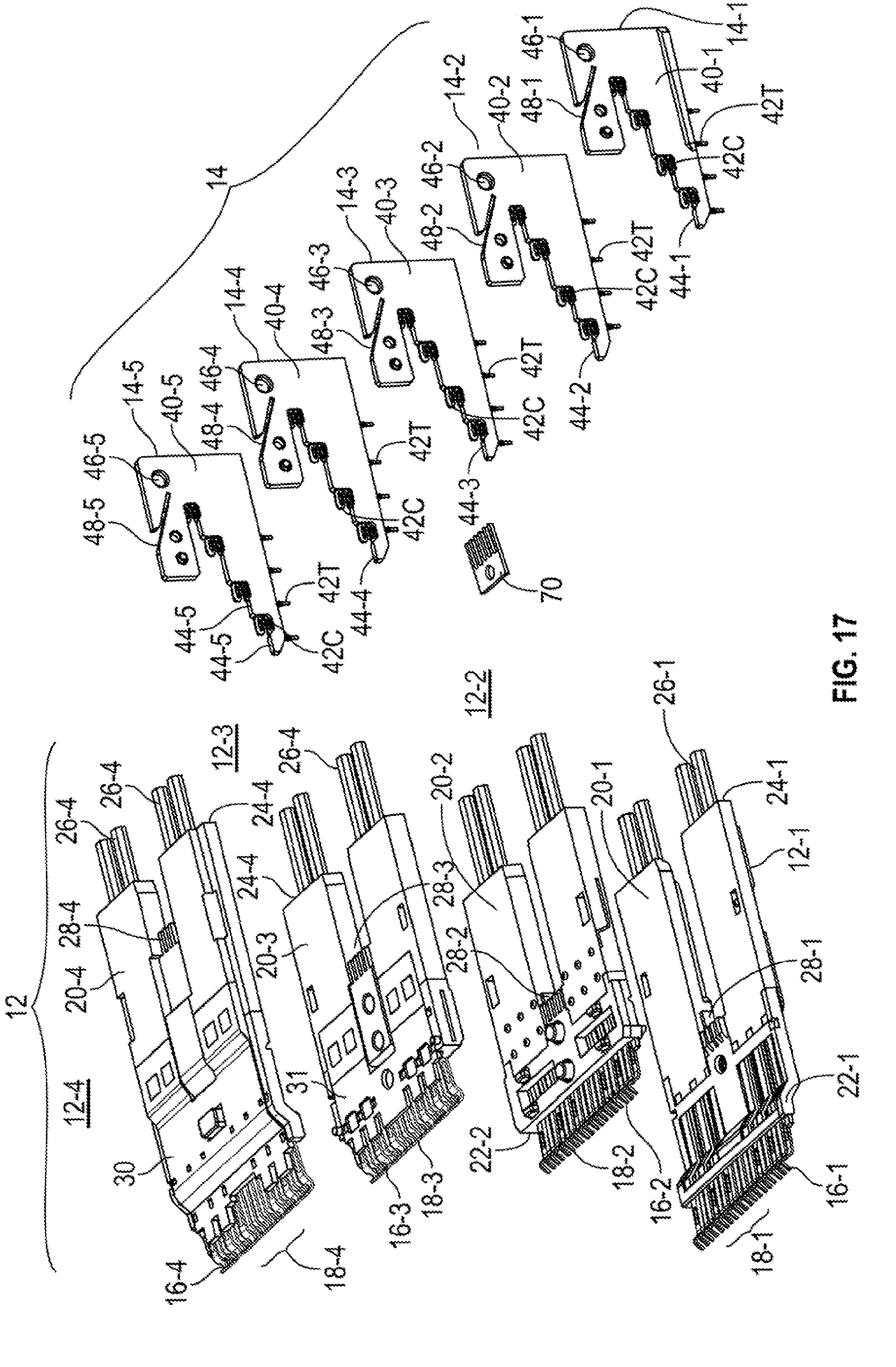
FIG. 17 is an exploded isometric view that illustrates a relationship between an exemplary number of non-high-speed terminals formed within a horizontal wafer and the number of vertical wafers that may be used for complete interconnection.

In the exemplary embodiment of FIG. 11 vertical wafer 14 includes an aperture 46 which may be used to support an optional fixing pin that passes thru the side-by-side set of vertical wafers (see FIG. 17). An inclined surface 48 may be formed within the structure of frame 40 as also shown in FIG. 11. In an embodiment, when vertical wafers 14 are positioned side-by-side, an optional tie bar 70 (that may be composed of a metal alloy such as stainless steel) may be placed to engage with the complete set of inclined surfaces 48 (see FIG. 15 for example) to further support and stabilize the connection of the plurality of vertical wafers 14 to the plurality of horizontal wafers 12.

Figure 13:
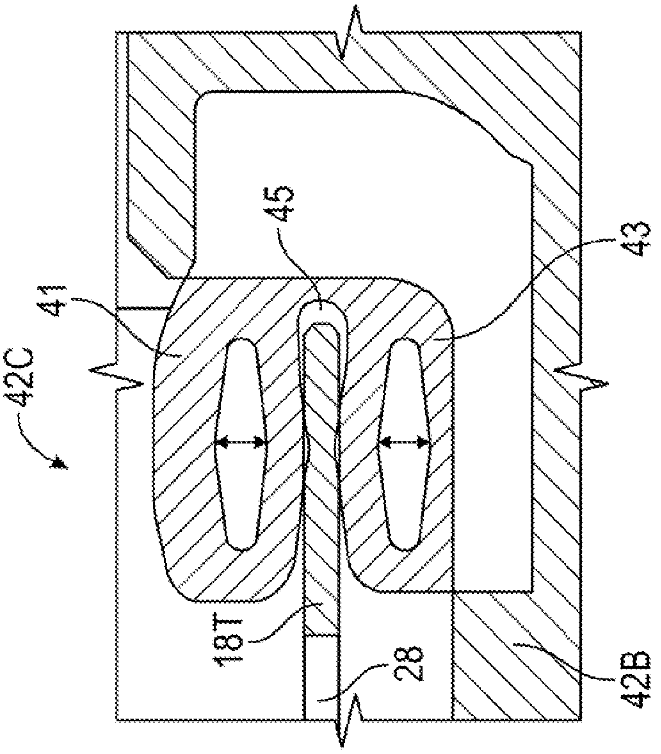
FIG. 13 is an enlarged view similar to that of FIG. 13 where, in this case, subsequent to the connection between the wafers and further illustrating an exemplary position of a tail portion of a non-high-speed terminal within a C-clamp connector of a vertical wafer terminal.
Figure 12:
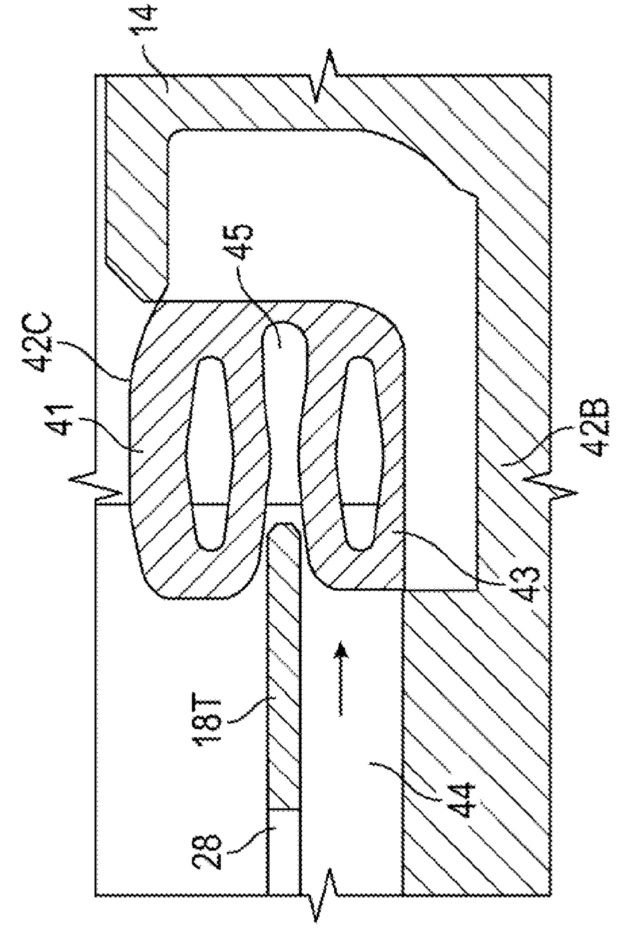
FIG. 12 is an enlarged view of an exemplary connector portion of a vertical wafer terminal, shown in combination with a tail portion of a non-high-speed terminal from a horizontal wafer, prior to making contact between the two wafers.

In the embodiment of FIG. 11, connector end portions 42C of vertical terminal 42 may be formed as a C-clamp arrangement of a pair of eye-of-needle (EON) terminations 41, 43. Referring now to FIG. 12 there is depicted an enlarged view of an exemplary connector portion 42C and an associated tail end portion 18T from a non-high-speed terminal 18 exiting a horizontal wafer 12. In an embodiment, the C-clamp arrangement of EONs 41, 43 may guide tail end portion 18T into a throat area 45 located between EONs 41, 43, where the movement of tail end portion 18T is indicated by the arrow in FIG. 12. FIG. 13 shows compressed EONs 41, 43 applying a normal force on both the top and bottom surfaces of tail end portion 18T as it is guided (e.g., slid) into place within C-clamp connector portion 42C.

Figure 14:
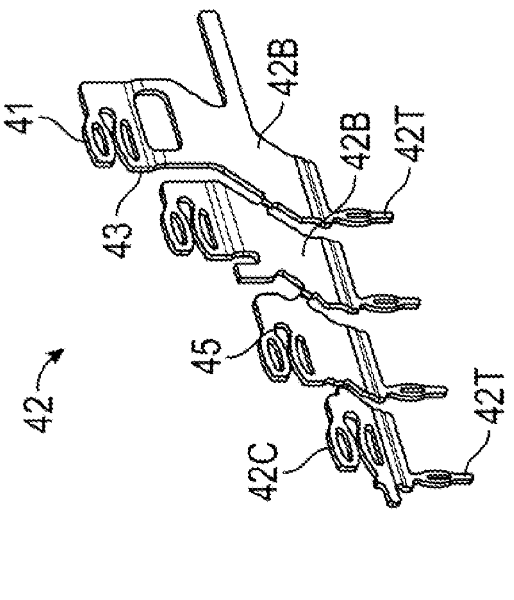
FIG. 14 is a side isometric view of a conductive terminal that may be used within a vertical wafer to provide connection to a non-high-speed terminal of a horizontal wafer.

Referring now to FIG. 14 there is depicted an isometric view of an exemplary vertical terminal 42 that may be used as a component of vertical wafer 14 in the embodiment depicted in FIG. 12. In FIG. 14, the vertical terminals 42, shown prior to singulation and prior to being over-molded, may comprise a metallic material such as copper alloy. The vertical terminals 42, which are depicted as four in a row but could be some other number, are thus used to form the vertical wafer 14. Interior body portions 42B of each vertical terminal 42 are particularly shown in this view, with body portions 42B each terminating in their individual tail portions 42T (again, shown here as being press-fit pins).

Figure 15:
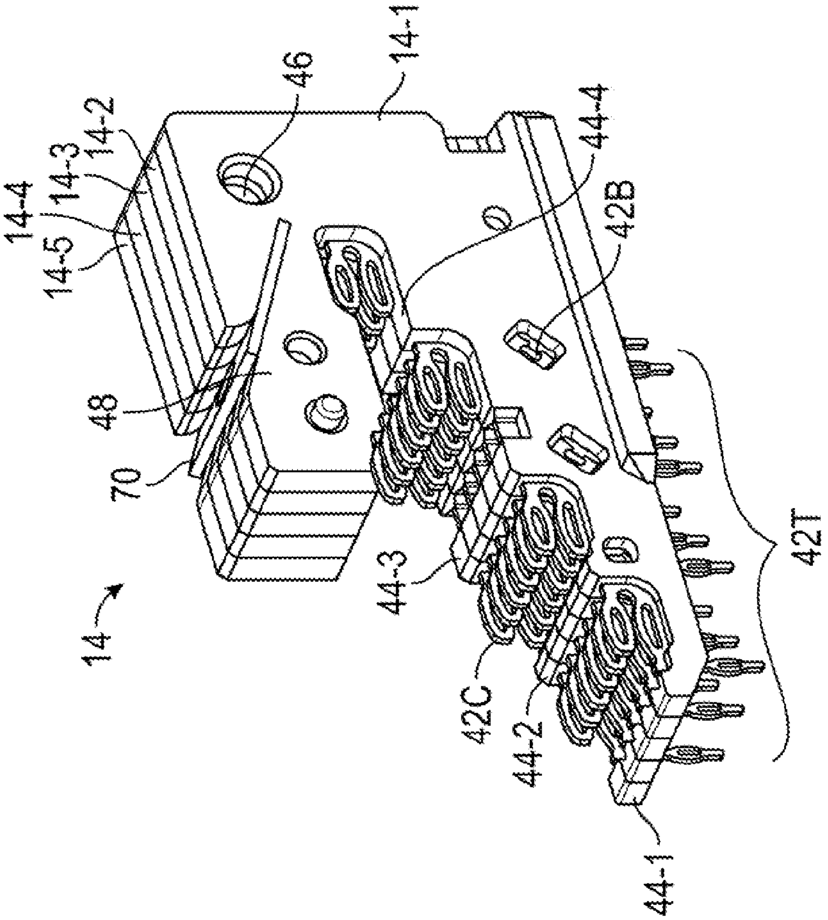
FIG. 15 illustrates a side-by-side organization of a collection of vertical wafers that may be interconnected with a plurality of horizontal wafers to provide paths for non-high data rate signals.

FIG. 15 illustrates an exemplary side-by-side configuration of the plurality of vertical wafers 14 that may ultimately engage with exposed ends of the plurality horizontal wafers 12 (not shown). The isometric side view of FIG. 15 shows the exemplary side-by-side placement of connector end portions 42C of vertical terminals 42, with each individual connector end portion 42C positioned to engage with a tail portion 18T from non-high-speed terminals 18 in a one-to-one relationship. For example, and as discussed above, if each horizontal wafer includes an exemplary set of five separate non-high-speed terminals $\mathbf{18}_1$ to $\mathbf{18}_5$ (see FIG. 17), then a set of five individual vertical wafers (positioned side by side) can be used such that each terminal $\mathbf{18}_1$ to $\mathbf{18}_5$ of each horizontal wafer 12-*i* has a mating non-high-speed connection. Similarly, the tiered configuration of the side-by-side collection of vertical wafers 14 illustrates that the number of landing steps 44 (and associated connector end portions 42C) can be the same as the number of individual horizontal wafers 12.

Figure 16:
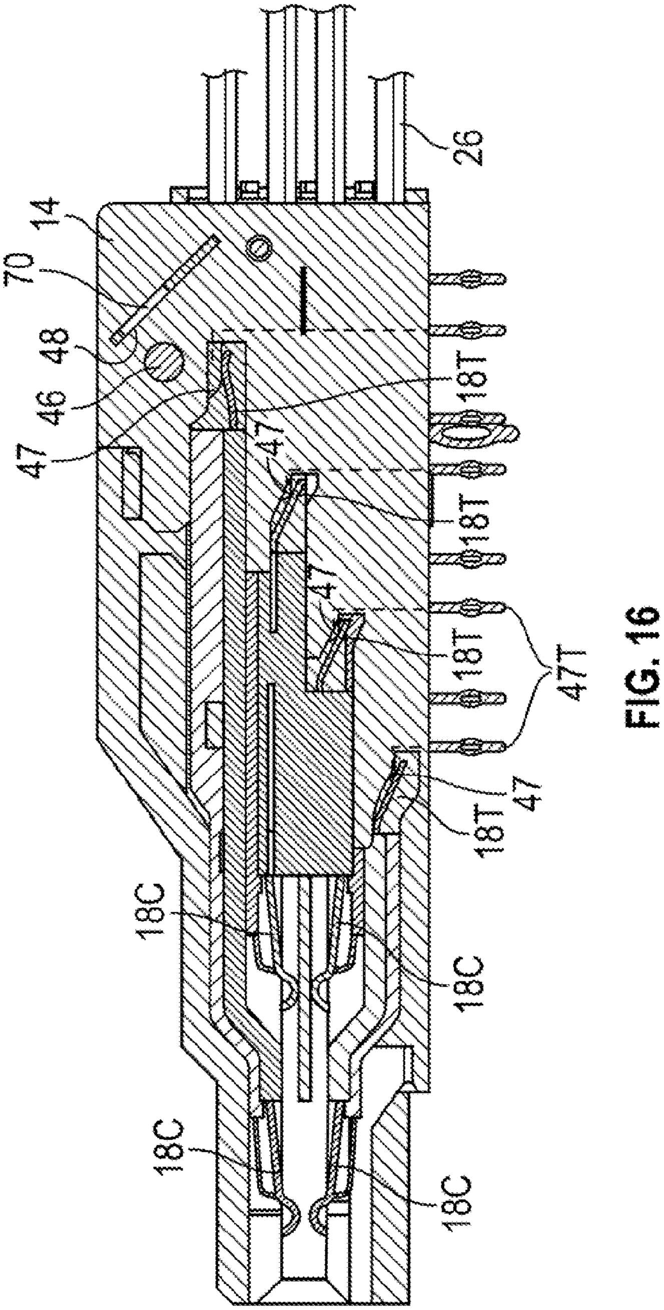
FIG. 16 is a cut-away side view of an alternative interconnection arrangement, using exemplary cantilevered beams in vertical wafers to provide electrical connection to non-high-speed terminals within a plurality of horizontal wafers.

FIG. 16 is a cut-away side view of an alternative interconnection configuration of non-high-speed terminals 18 and the plurality of vertical wafers 14. Instead of terminals with a C-clamp connector 42C as illustrated in FIGS. 12-15, a cantilevered arrangement of conductive connector bumps 47 configured on the underside of landing steps 44 for contacting non-high-speed tail portions 18T may be included. In an embodiment, upon engaging with the plurality of horizontal wafers 12, landing steps 44 of vertical wafers 14 may exert a slight force of tail portions 18T, directing them to come in contact with conductive bumps 47. The nominal spring force applied by the conductive bumps 47 functions to maintain physical contact between conductive bumps 47 and associated tail portions 18T. Similar to vertical terminals 42 of the above arrangement, conductive connector bumps 47 may thereafter extend as conductive bodies within frame material 40 and exit along a connecting surface, shown here as comprising a plurality of press-fit pins 47P that exit from a lower surface of vertical wafers 14.

Referring now to FIG. 17 there is depicted an exploded isometric view that illustrates the relationship between an exemplary number of non-high-speed terminals 18 formed within horizontal wafers 12-1-12-4 and an exemplary number of vertical wafers 14 that may be used to interconnect with these terminals. Also evident in this view is the one-to-one relationship between the number of individual horizontal wafers 12 and the number of individual landing steps (tiers) that may be formed in each vertical wafer 14 to provide connection to each individual horizontal wafer 12. As shown, a set of four individual horizontal wafers 12-1 through 12-4 may be configured to form a plurality of horizontal wafers, where each horizontal wafer 12-*i* includes a set of five individual non-high-speed terminals $\mathbf{18}_1$ to $\mathbf{18}_5$. Thus, in order to engage with the set of five terminal portions 18T1-18T5 of each horizontal wafer 12-*i*, a set of five vertical wafers 14-1 through 14-5 can be used, as shown in FIG. 17. Each vertical wafer 14-I may be configuratively tiered to include a set of four separate landing steps 44-1 through 44-4 (and associated connector end portions 42C). An exemplary tie bar 70 is also shown and may be configured to slide into the side-by-side position of inclined surfaces 48, thereby supporting and stabilizing the collection of vertical wafers 14.

Figure 18:
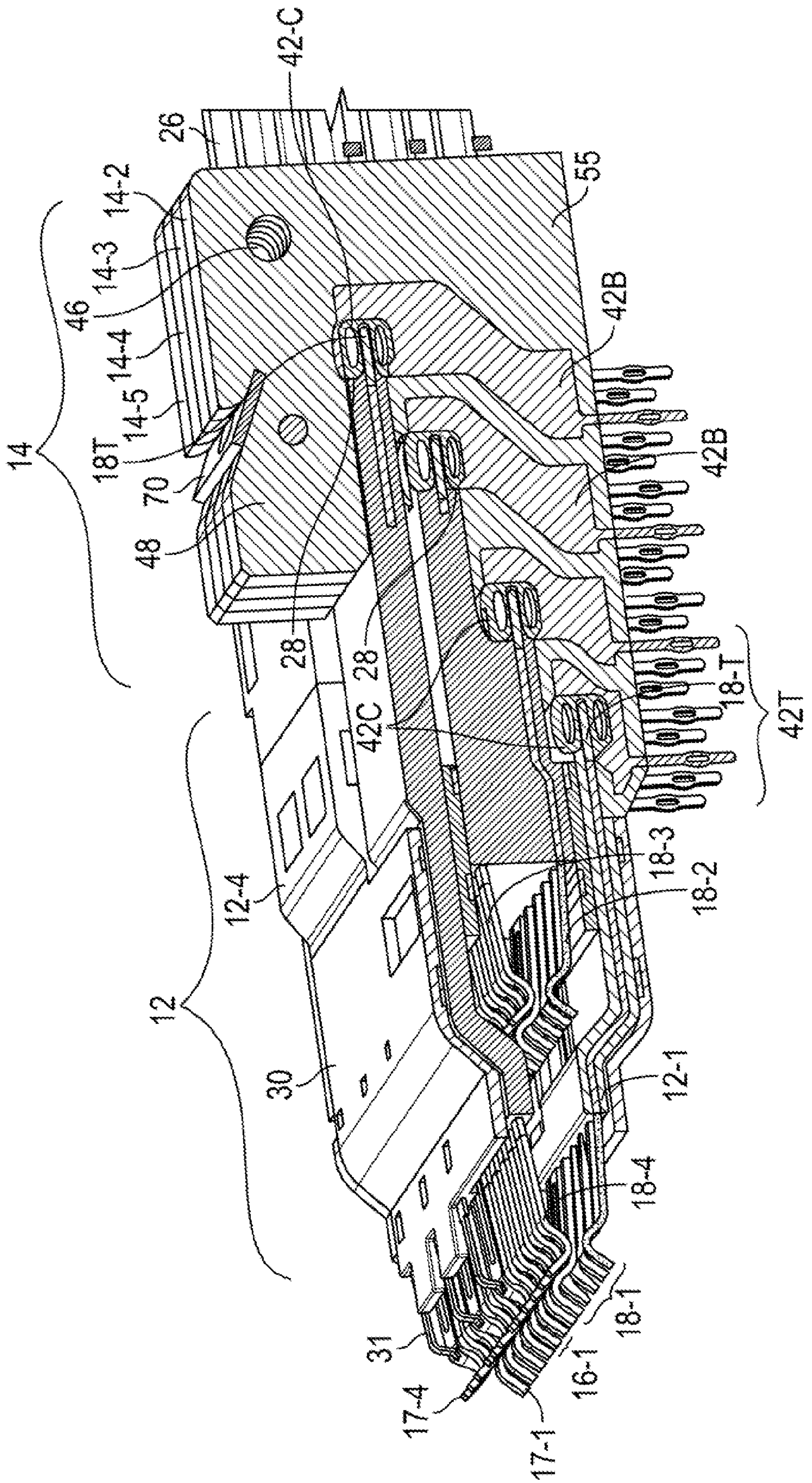
FIG. 18 is an isometric, cut-away view of an exemplary combination of a plurality of horizontal wafers with a side-by-side collection of vertical wafers.

FIG. 18 depicts an isometric, cut-away view of a combination of a plurality of horizontal wafers 12 and a side-by-side set of vertical wafers 14. The cut-away view is taken longitudinally between vertical wafers 14-1 and 14-2, so that a side surface SS of vertical wafer 14-2 is visible. The exemplary locations of non-high-speed terminals 18 for each horizontal wafer 12-1 through 12-4 is evident in this view, as is the exemplary engagement of each horizontal wafer 12-1 through 12-4 with a separate landing step 44-1 through 44-4 on the tiered configuration of vertical wafer 14-2. The body portions 42B of vertical terminals 42 within vertical wafer 14-2 are also shown in this view, which further illustrates the termination of each terminal 42 in a tail portion 42T that may ultimately engage with a defined location on an electrical circuit board (or another, similar type of structure).

Figure 19:
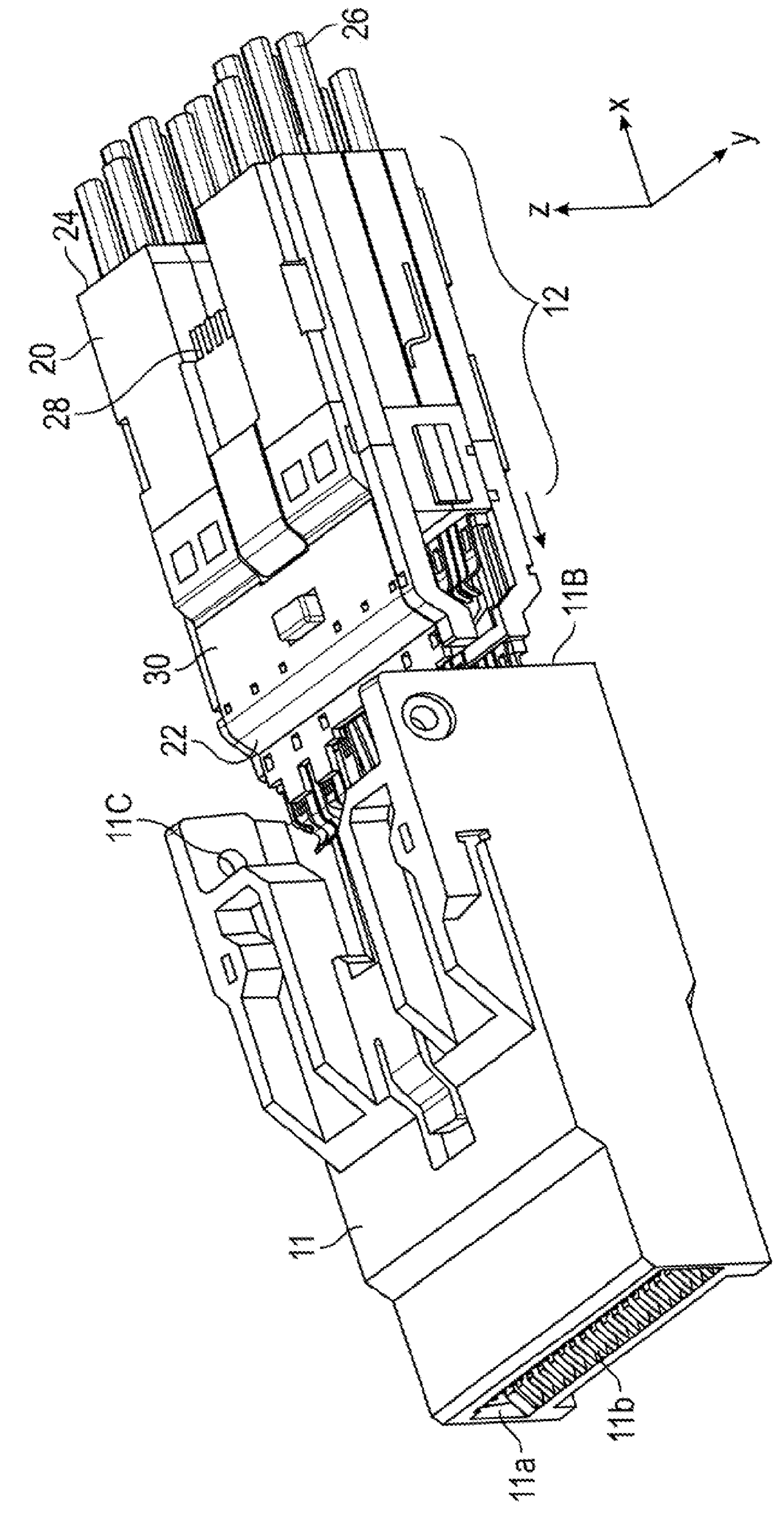
FIG. 19 is an isometric side elevational view of an exemplary, insulating housing element and a plurality of horizontal wafers that may be used in forming an electrical connector assembly.
Figure 20:
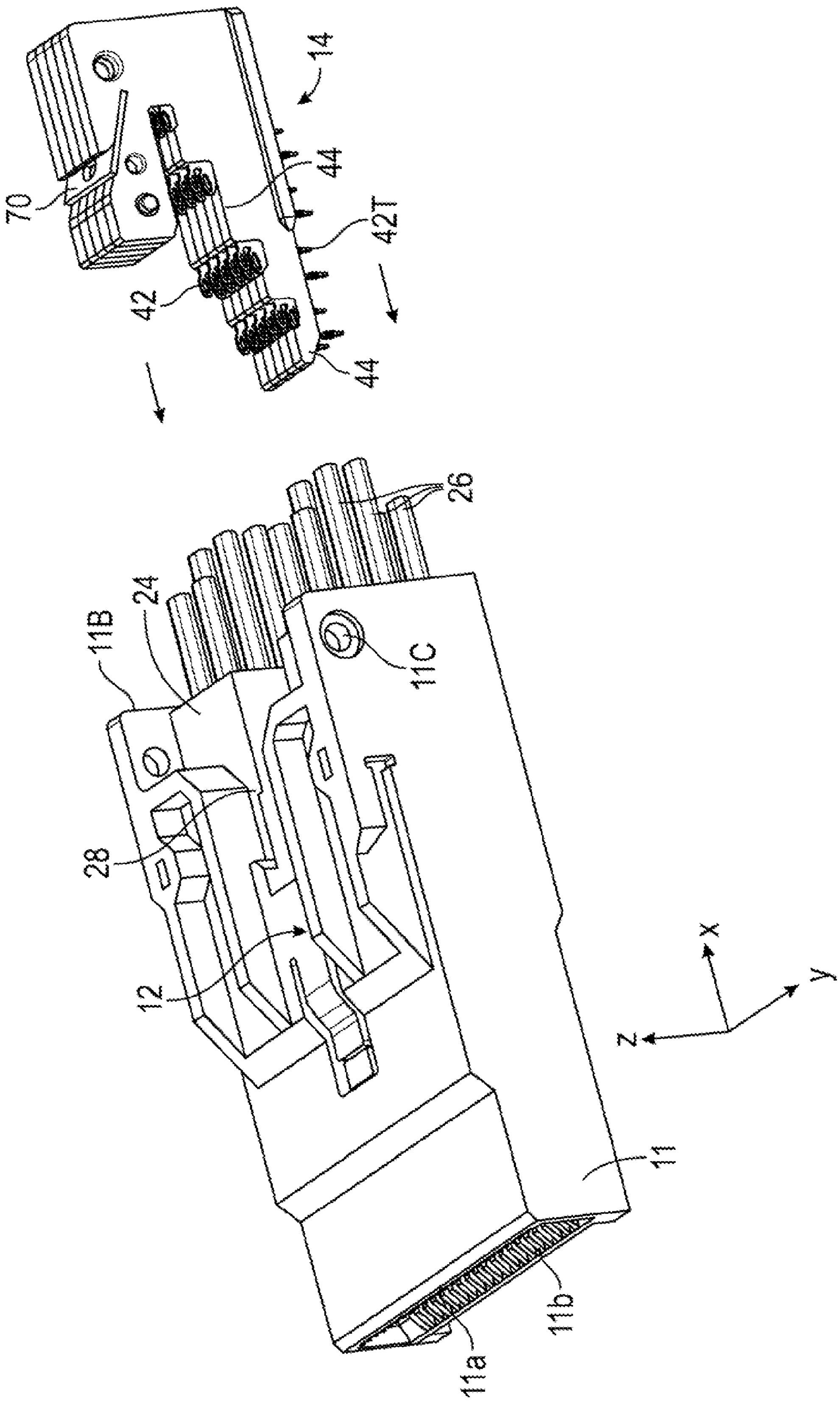
FIG. 20 is an isometric side elevational view, related to FIG. 19, further illustrating a relationship between the plurality of horizontal wafers and the side-by-side collection of vertical wafers.

Referring to FIG. 19 there is depicted an isometric view of exemplary insulative housing 11 and a plurality of horizontal wafers 12, indicating by the arrows the direction in which the horizontal wafers 12 may be positioned within housing 11. In more detail, exemplary front edges 22 of the frames 20 forming the horizontal wafers 12 may be inserted into a rear opening of housing 11, with rear edges 24 of the horizontal frames 20 ultimately positioned to align with a back edge 11B of housing 11 when the horizontal wafers 12 is fully inserted. Cables 26, supporting the signal paths associated with high-speed terminals 16 may exit horizontal wafers 12 along the set of rear edges 24 as shown. Recessed rear edges 28 of the horizontal wafers 12 may remain exposed at this point in the assembly, allowing for the side-by-side collection of vertical wafers 14 to engage with the non-high-speed terminals 18 of horizontal wafers 12. Indeed, FIG. 20 illustrates a subsequent step in an exemplary assembly process, where the side-by-side collection of vertical wafers 14 may be inserted within the open area between rear edges 24 of frames 20 (of horizontal wafers 12) to mate with recessed rear edges 28 of frames 20 in the manner previously discussed to provide electrical connections between non-high-speed terminals 18 of horizontal wafers 12 and an exterior structure (e.g., an electrical circuit board).

Figure 21:
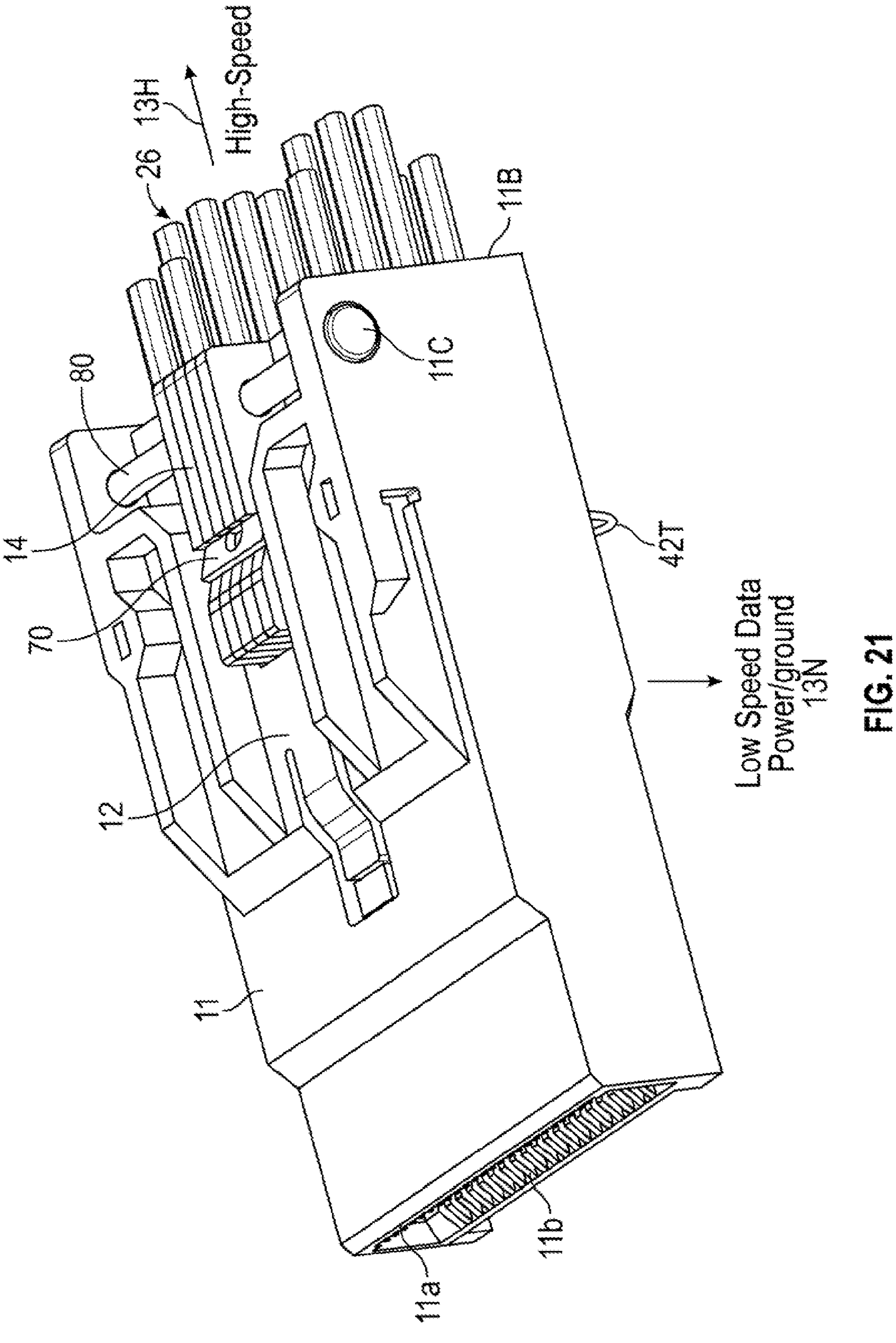
FIG. 21 is an isometric side elevational view, related to FIGS. 19 and 20, illustrating an exemplary assembled connector that may include a housing, a plurality of horizontal wafers, and side-by-side collection of vertical wafers.

FIG. 21 depicts an exemplary isometric view of electrical connector assembly 10, showing vertical wafers 14 connected to horizontal wafers 12 within insulative housing 11. In this view, tie bar 70 may be used to fix the side-by-side grouping of vertical wafers 14. Also shown in this view is an optional locator pin 80 that may pass through the collected apertures 46 of vertical wafers 14, as well as aligned apertures 11*c* formed in insulative housing 11 (apertures 11*c* are best shown in FIGS. 19 and 20). The interconnection of horizontal wafers 12 and vertical wafers 14 as discussed previously herein provides a path for transporting non-high data rate signals (either signals at a lower data rate or electrical power) without disturbing the paths used for transport of high data rate signals.

Figure 22:
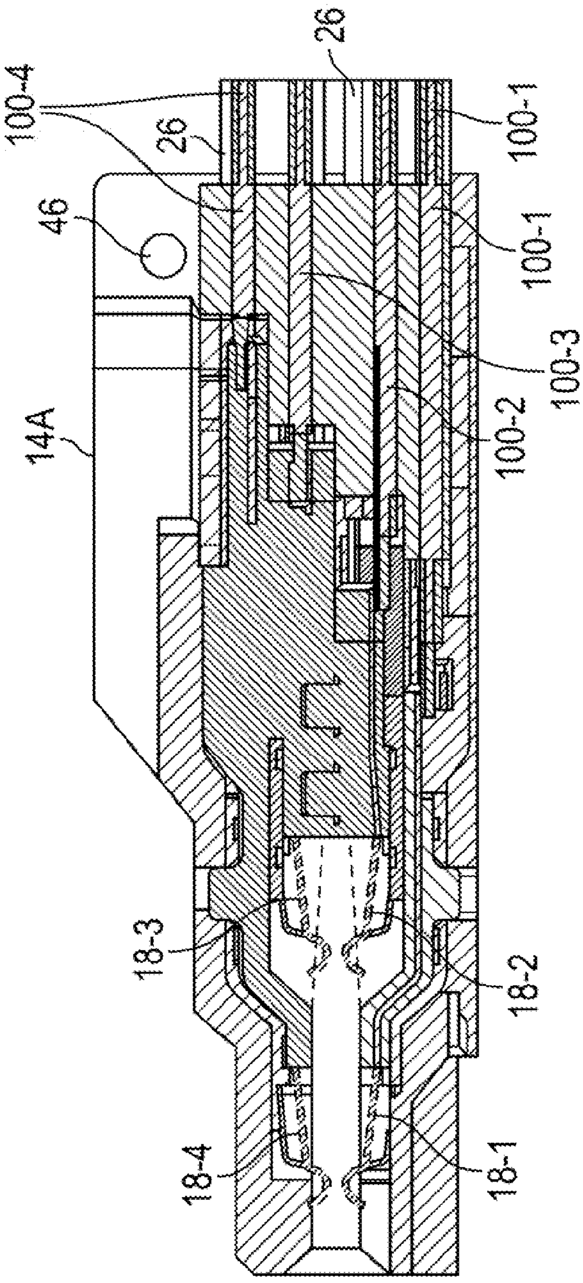
FIG. 22 is a cut-away side view of an exemplary combination of a plurality of horizontal wafers with a side-by-side collection of vertical wafers, where the vertical wafer terminals may be formed to exit through a back edge of the vertical wafers.

FIG. 22 is a cut-away side view of an exemplary combination of horizontal wafers 12 and a side-by-side collection of vertical wafers 14A. In this embodiment, each vertical wafer 14A may include a set of non-high-speed terminals 100 that may not exit through the bottom edge of the vertical wafer (as compared to vertical connectors 42, previously discussed). Instead, non-high-speed terminals 100 are included within each vertical wafer 14 and remain substantially in the same horizontal plane and exit at back surface of connector assembly 10, similar to the positioning of the high speed signal paths, shown as encased within cables 26 in the view of FIG. 22.

Figure 23:
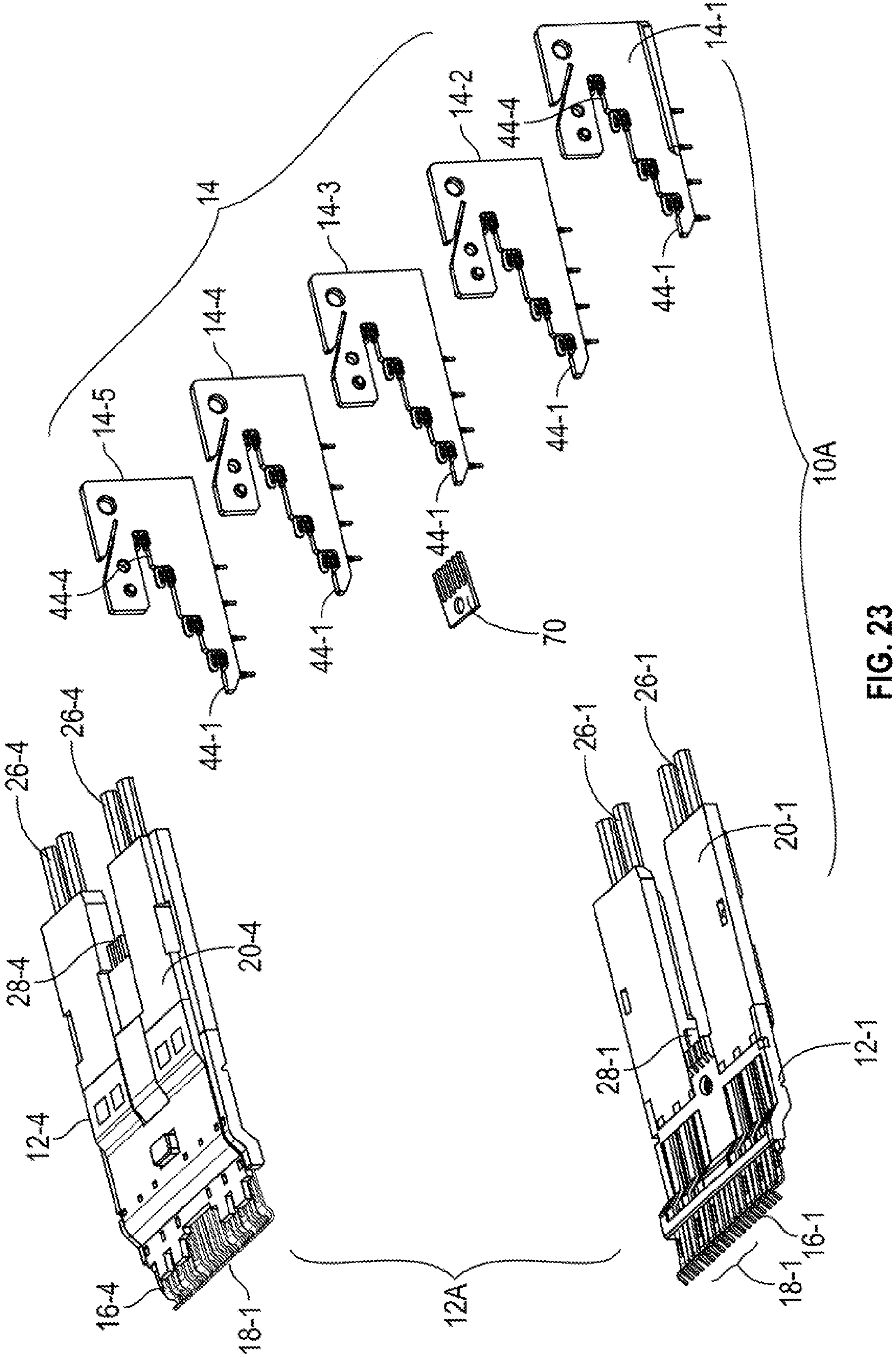
FIG. 23 is an exploded, isometric view of an exemplary connector assembly that may include a pair of horizontal wafers and interconnected, side-by-side vertical wafers.

Referring to FIG. 23 there is depicted an exemplary, exploded, isometric view of an alternative electrical connector assembly 10A. In this embodiment only a pair (e.g., two) of horizontal wafers 12A are provided (in one case, the pair of horizontal wafers may correspond to the "top" and "bottom" horizontal wafers 12-1 and 12-4 of the arrangements discussed previously). Horizontal wafers 12A may include a set of five non-high-speed terminals 18. Accordingly, a similar side-by-side collection of five individual vertical wafers 14 may be connected to the pair of horizontal wafers 12A to form the necessary non-high-speed interconnections. In this embodiment, when the wafers 12A, 14 are joined together, lower horizontal wafer 12-1 may be positioned on the lowest landing step 44-1 of each vertical wafer 14 and upper horizontal wafer 12-4 may be positioned on the highest landing step 44-4 of each vertical wafer 14. FIG. 23 illustrates only one alternative; for example, an assembly using a set of three horizontal wafers is another possible assembly configuration.

As can be appreciated from the above description, in certain embodiments a housing will support a plurality of horizontal wafers that engage a plurality of vertical wafers and is configured so that high speed signals extend rearward of the horizontal wafers via cables while the non-high-speed signal are directed down toward a supporting substrate vie vertical terminals that engage the substrate via a desirable attachment means such as, but not limited to, press-fit or SMT attach. Furthermore, horizontal non-high-speed terminals in the horizontal wafers will engage vertical terminals in the vertical wafers.

It will be appreciated that the foregoing description provides examples of the disclosed electrical connector assembly. However, it is contemplated that other implementations of the disclosure may differ in detail from the foregoing examples. All references to the disclosure or examples thereof are intended to reference the particular example being discussed at that point and are not intended to imply any limitations as to the scope of the disclosure more generally. Recitation of ranges of values herein are merely intended to serve as a shorthand method of referring individually to each separate value falling within the range, unless otherwise indicated herein, and each separate value is incorporated into the specification as it if were individually recited herein.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context. Still further, the advantages described herein may not be applicable to all embodiments encompassed by the claims.

While benefits, advantages, and solutions have been described above with regard to specific embodiments of the present invention, it should be understood that such benefits, advantages, and solutions and any element(s) that may cause or result in such benefits, advantages, or solutions, or cause such benefits, advantages, or solutions to become more pronounced are not to be construed as a critical, required, or an essential feature or element of any or all the claims appended to the present disclosure or that result from the present disclosure.

I claim:

1. An electrical connector assembly comprising:

a housing;

a plurality of horizontal wafers positioned in the housing, each horizontal wafer comprising:

a pair of high-speed terminals configured to conduct signaling at a high data rate and connected to a conductor pair;

a plurality of non-high-speed terminals configured to conduct power and signaling at a low data rate, wherein the high-speed terminals and the non-high-speed terminals comprise contacts aligned in a row adjacent a front edge of the horizontal wafer and terminal bodies extending rearward of the contacts, the high-speed terminals terminated to conductors in a cable, the cable extending from a rear edge of the wafer and the non-high-speed terminals configured to terminate as tails exposed at a recessed rear edge of the horizontal wafer; and a ground shield over or under a portion of the terminal bodies of the high-speed terminals; and a plurality of vertical wafers, the plurality of vertical wafers being positioned side-by-side and each vertical wafer comprising:

a plurality of vertical terminals, each vertical terminal comprising a contact portion, a tail portion and a body portion therebetween, and each contact portion being configured to mate with a tail of each non-high-speed terminal at the recessed rear edge of the plurality of horizontal wafers.

2. The electrical connector assembly of claim 1, wherein the high speed terminals are configured to support a signaling rate of 50 Gbps.

3. The electrical connector assembly of claim 2, wherein the high-speed terminals are configured to support a signaling rate of 100 Gbps.

4. The electrical connector assembly of claim 1, wherein the plurality of vertical wafers comprises a tiered configuration for mating with the plurality of recessed rear edges of the plurality of horizontal wafers.

5. The electrical connector assembly of claim 1, wherein the contact portion of the vertical terminal comprises a C-clamp structure.

6. The electrical connector assembly of claim 5, wherein the C-clamp structure comprises a pair of eye-of-the-needle elements, separated by a throat spacing.

7. The electrical connector assembly of claim 1, further comprising a tie bar configured to support and stabilize the plurality of vertical wafers in a stable side-by-side position.

8. The electrical connector assembly of claim 1, further comprising a locating pin configured to pass through a set of apertures formed in each vertical wafer of the plurality of vertical wafers, as well as apertures formed in end termination regions of the insulative housing, the locating pin supporting the plurality of vertical wafers in an aligned relationship with the plurality of horizontal wafers.

9. The electrical connector assembly of claim 1, wherein the ground shield comprises a stamped metal frame overmolded with plastic.

10. The electrical connector assembly of claim 1, wherein the tail portion of each of the vertical wafer terminals comprises press-fit tails or surface mount technology (SMT) tails.

11. The electrical connector assembly of claim 1, wherein each vertical wafer is configured as a tiered structure and comprises a plurality of separate landing steps that expose the contact portion of each of the vertical wafer terminals, the plurality of separate landing steps being at least sufficient to support the plurality of horizontal wafers in a one-to-one relationship, with each exposed contact portion extending from the recessed rear edge.

12. An electrical connector assembly comprising:

a housing;

a plurality of horizontal wafers, each horizontal wafer comprising:

a frame;

high-speed terminals configured to conduct signaling at a high data rate and supported by the frame; and non-high-speed terminals supported by the frame, the non-high-speed configured to conduct power and signaling at a low-data rate, wherein the high-speed terminals and the non-high-speed terminals comprise contacts aligned in a row adjacent a front edge of the horizontal wafer and terminal bodies extending rearward of the contacts, the high-speed terminals terminated to cables that extend beyond a rear edge of the horizontal wafer and the non-high-speed terminals configured to terminate as tails exposed as an interior edge somewhat recessed from the rear edge; and a plurality of vertical wafers, the plurality of vertical wafers being positioned side-by-side and each vertical wafer comprising:

a frame; and terminals, comprising a contact portion, a tail portion and a body portion therebetween, the contact portion being configured to mate with a tail of each non-high-speed terminal at the interior edges of the plurality of horizontal wafers, wherein the plurality of vertical wafers has one vertical wafer for each non-high-speed terminal in a respective horizontal wafer of the plurality of horizontal wafers, and wherein each horizontal wafer of the plurality of horizontal wafers has a same number of non-high-speed terminals.

13. The electrical connector assembly of claim 12, wherein the electrical connector assembly is configured to support the high data rate being 50 gigabits per second (Gbps).

14. The electrical connector assembly of claim 13, wherein the electrical connector assembly is configured to support the high data rate being 100 Gbps.

15. The electrical connector assembly of claim 12, wherein at least one contact portion of a terminal of a vertical wafer comprises a C-clamp structure.

16. The electrical connector assembly of claim 12, further comprising a support and stabilization element configured to span across and capture the plurality of vertical wafers to support and stabilize the side-by-side arrangement.

17. A horizontal wafer for use within an electrical connector assembly, comprising:

a frame composed of an insulative material, the frame having a front edge and an opposing rear edge;

a plurality of high-speed terminals supported by the frame and configured to conduct signaling at a high-data rate, each high-speed terminal comprising a contact end portion exposed at the front edge of the frame and a tail end portion terminated to a conductor of a twin-ax cable, the twin-ax cable extending from the opposing rear edge, with a body portion and the tail end portion of each high-speed terminal embedded within the insulative material of the frame; and a plurality of non-high-speed terminals supported by the frame and configured to conduct signaling at a low-data rate, wherein the non-high-speed terminals are aligned with the plurality of high-speed terminals and each non-high-speed terminal comprises a contact portion exposed at the front edge of the frame and a tail end portion exposed at a recessed rear edge, with a body portion of each non-high-speed terminal embedded within the frame, and the recessed rear edge being recessed by an amount from the opposing rear edge of the frame.

18. The horizontal wafer of claim 17, further comprising a plurality of ground terminals positioned between the plurality of non-high-speed terminals and the plurality of high-speed terminals, the plurality of ground terminals aligned with the contact end portions of the plurality of high-speed terminals.

19. The horizontal wafer of claim 18, further comprising a ground shield positioned over the frame and configured to provide electromagnetic interference (EMI) shielding for the horizontal wafer.

20. The horizontal wafer of claim 19, wherein the ground shield comprises a plurality of grounding tabs that engage with the plurality of ground terminals when the ground shield is positioned over the frame.

* * * * *